United States Patent
Hinduja et al.

(10) Patent No.: US 11,756,005 B2
(45) Date of Patent: Sep. 12, 2023

(54) SCHEDULING VEHICLE MAINTENANCE AT SERVICE CENTERS

(71) Applicant: ANI TECHNOLOGIES PRIVATE LIMITED, Bengaluru (IN)

(72) Inventors: Hitesh Hinduja, Thane (IN); Gaurav Agarwal, Bangalore (IN); Vineet Nandan, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 0 days.

(21) Appl. No.: 17/100,299

(22) Filed: Nov. 20, 2020

(65) Prior Publication Data

US 2022/0092556 A1    Mar. 24, 2022

(30) Foreign Application Priority Data

Sep. 21, 2020    (IN) ............................ 202041040785

(51) Int. Cl.
*G06Q 10/20*    (2023.01)
*G06Q 10/0631*    (2023.01)
(Continued)

(52) U.S. Cl.
CPC ......... *G06Q 10/20* (2013.01); *G06F 16/2379* (2019.01); *G06F 16/955* (2019.01); *G06Q 10/06312* (2013.01); *G06Q 10/06316* (2013.01); *G06Q 10/063114* (2013.01); *G06Q 10/10* (2013.01)

(58) Field of Classification Search
CPC .................................................... G06Q 10/20
See application file for complete search history.

(56) References Cited

U.S. PATENT DOCUMENTS 9,646,290 B2    5/2017  Walton
10,289,101 B2 *  5/2019  Sillay ................. G06F 3/04847
(Continued)

FOREIGN PATENT DOCUMENTS

CN    110689258 A    1/2020

OTHER PUBLICATIONS

R. Lewandowski et al, Automated Task Scheduling for Automotive Industry, INES 2020 • 24th International Conference on Intelligent Engineering Systems • Jul. 8-10, 2020, pp. 159-164 (Year: 2020).*
(Continued)

*Primary Examiner* — Andre D Boyce
(74) *Attorney, Agent, or Firm* — CHIP LAW GROUP

(57) ABSTRACT

A method for vehicle maintenance at a service center is provided. A set of vehicular datasets for a set of vehicles, at a service center, is retrieved from a database. Based on the set of vehicular datasets, a service schedule for servicing the set of vehicles is determined. The service schedule is indicative of a first sequence for servicing the set of vehicles. The servicing of a first subset of the set of vehicles is initiated based on the first sequence. A progress of the servicing of the first subset of the set of vehicles is monitored based on status reports. Based on the monitored progress, the service schedule for a second subset of the set of vehicles is updated. Based on the updated service schedule, the servicing of the second subset of the set of vehicles is initiated based on a second sequence.

16 Claims, 12 Drawing Sheets

(51) Int. Cl.
*G06F 16/955* (2019.01)
*G06F 16/23* (2019.01)
*G06Q 10/10* (2023.01)

(56) References Cited

U.S. PATENT DOCUMENTS

| | | | | |
|---|---|---|---|---|
| 2002/0016729 | A1* | 2/2002 | Breitenbach | G06Q 10/08 |
| | | | | 707/802 |
| 2002/0152105 | A1* | 10/2002 | Dan | G06Q 10/109 |
| | | | | 718/100 |
| 2003/0055666 | A1* | 3/2003 | Roddy | G06Q 10/06395 |
| | | | | 705/305 |
| 2005/0050091 | A1* | 3/2005 | Inoue | G06Q 10/06 |
| 2005/0171661 | A1* | 8/2005 | Abdel-Malek | G07C 5/008 |
| | | | | 701/31.4 |
| 2012/0136527 | A1* | 5/2012 | McQuade | G06Q 30/08 |
| | | | | 701/29.4 |
| 2012/0136743 | A1* | 5/2012 | McQuade | G06Q 30/0283 |
| | | | | 705/26.3 |
| 2012/0136802 | A1* | 5/2012 | McQuade | G06Q 30/08 |
| | | | | 705/347 |
| 2014/0136259 | A1* | 5/2014 | Kinsey, II | G06Q 30/0631 |
| | | | | 705/7.16 |
| 2018/0232707 | A1* | 8/2018 | Angai | G06Q 10/20 |
| 2018/0314255 | A1* | 11/2018 | Nistler | G07C 5/0808 |
| 2020/0043068 | A1* | 2/2020 | McQuade | G06Q 30/0611 |
| 2020/0074758 | A1 | 3/2020 | Boggio | |
| 2020/0126326 | A1* | 4/2020 | Lavie | G06Q 10/00 |
| 2020/0143332 | A1* | 5/2020 | Root | G06Q 10/063114 |
| 2020/0184739 | A1* | 6/2020 | Nathan | G06Q 10/20 |
| 2020/0210965 | A1* | 7/2020 | Garber | G06N 5/04 |
| 2021/0042708 | A1* | 2/2021 | Gardiner | G06Q 30/02 |

OTHER PUBLICATIONS

N. Shivasankaran et al, Scheduling of Mechanics in Automobile Repair Shops Using Ann, Indian Journal of Computer Science and Engineering (IJCSE), vol. 5 No. 2 Apr.-May 2014, pp. 55-60 (Year: 2014).*

Ghassan M. Tashtoush et al, Reliability Analysis of Car Maintenance Scheduling and Performance, Jordan Journal of Mechanical and Industrial Engineering, vol. 4, No. 3, Jun. 2010 ISSN 1995-6665, pp. 388-393 (Year: 2010).*

* cited by examiner

300

| | 302a | 302b | 302c | 302d | 302e | 302f |
|---|---|---|---|---|---|---|
| | Identification Information of Vehicle | Asset health index | Probability of failure of braking system (%) | Driver score | Running cost per unit distance ( dollar cost per km) | Manufacturer mandated service interval (km) |
| 304a | V_ID1 | 93 | 23 | 82 | 0.11 | 8,000 |
| 304b | V_ID2 | 87 | 47 | 88 | 0.87 | 12,000 |
| 304c | V_ID3 | 75 | 68 | 78 | 0.3 | 10,000 |
| 304d | V_ID4 | 66 | 88 | 54 | 1.2 | 6,500 |
| 304e | V_ID5 | 68 | 75 | 68 | 1.8 | 10,000 |

FIG. 3

| Operator | 10:00 am-11:00 pm | 11:00 am-12:00 pm | 12:00 pm-01:00 pm | 01:00 pm-02:00 pm | 02:00 pm-03:00 pm |
|---|---|---|---|---|---|
| First operator 106a | V_ID1 | V_ID1 | V_ID4 | V_ID4 | |
| Second operator 106b | V_ID2 | V_ID2 | V_ID5 | V_ID5 | |
| Third operator 106c | V_ID3 | V_ID3 | V_ID3 | | |

FIG. 6

| Operator | 10:00 am-11:00 pm | 11:00 am-12:00 pm | 12:00 pm-01:00 pm | 01:00 pm-02:00 pm | 02:00 pm-03:00 pm |
|---|---|---|---|---|---|
| First operator 106a | V_ID1 | V_ID1 | V_ID1 | V_ID1 | |
| Second operator 106b | V_ID2 | V_ID2 | V_ID5 | V_ID5 | |
| Third operator 106c | V_ID3 | V_ID3 | V_ID3 | V_ID4 | V_ID4 |

SCHEDULING VEHICLE MAINTENANCE AT SERVICE CENTERS

CROSS-RELATED APPLICATIONS

This application claims priority of Indian Non-Provisional Application No. 202041040785, filed Sep. 21, 2020, the contents of which are incorporated herein by reference.

FIELD

Various embodiments of the disclosure relate generally to vehicle maintenance. More specifically, various embodiments of the disclosure relate to methods and systems for organizing and scheduling vehicle maintenance at a service center.

BACKGROUND

Transportation constitutes an important aspect of the modern world. For transport, users may utilize various types of vehicles or automobiles such as motorbikes, autorickshaws, cars, buses, trucks, or the like. Modern vehicles (e.g. cars) are complex machines that include various vehicular systems such as air-conditioning (AC) systems, braking systems, suspension systems, or the like. These vehicles require periodic servicing to ensure satisfactory operation of corresponding vehicular systems and safety of passengers travelling in these vehicles.

For servicing, users may be required to bring their vehicles to a service center (i.e., a workshop or a garage). The service center may employ technicians for servicing the vehicles. The service center may schedule servicing sessions for the vehicles and allocate the technicians to the vehicles for servicing. However, these service centers typically rely upon manual and arbitrary methods (e.g., first-come-first-serve) for scheduling the servicing sessions and allocating the technicians to the vehicles. This leads to a sub-optimal service schedule for servicing the vehicles. The sub-optimal service schedule may result in poor utilization of the technicians and unpredictable turn-around times for servicing the vehicles. High turn-around times prove cumbersome to users, causing the users to avoid or delay servicing their vehicles. Delaying or avoiding servicing a vehicle compromises a safety and convenience of passengers traveling in the vehicles. Cumulative effect of such sub-optimal service schedules over a period of time may further result in loss of business to a transport fleet owner. For example, profitable vehicles of the transport fleet owner may unnecessarily experience high downtime due to sub-optimal service schedules, resulting in loss to the transport fleet owner.

In light of the foregoing, there exists a need for a technical and reliable solution that overcomes the abovementioned problems, and ensures effective scheduling of service sessions of vehicles at a service center.

SUMMARY

Methods and systems for vehicle maintenance at a service center are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

FIG. 3 represents a table that illustrates vehicular datasets of the set of vehicles, in accordance with an exemplary embodiment of the present disclosure;

FIG. 6 represents a table that illustrates a determined service schedule for servicing the set of vehicles, in accordance with an exemplary embodiment of the present disclosure;

FIG. 7 represents a table that illustrates an updated service schedule, in accordance with an exemplary embodiment of the present disclosure;

DETAILED DESCRIPTION OF EMBODIMENTS

Figure 1:
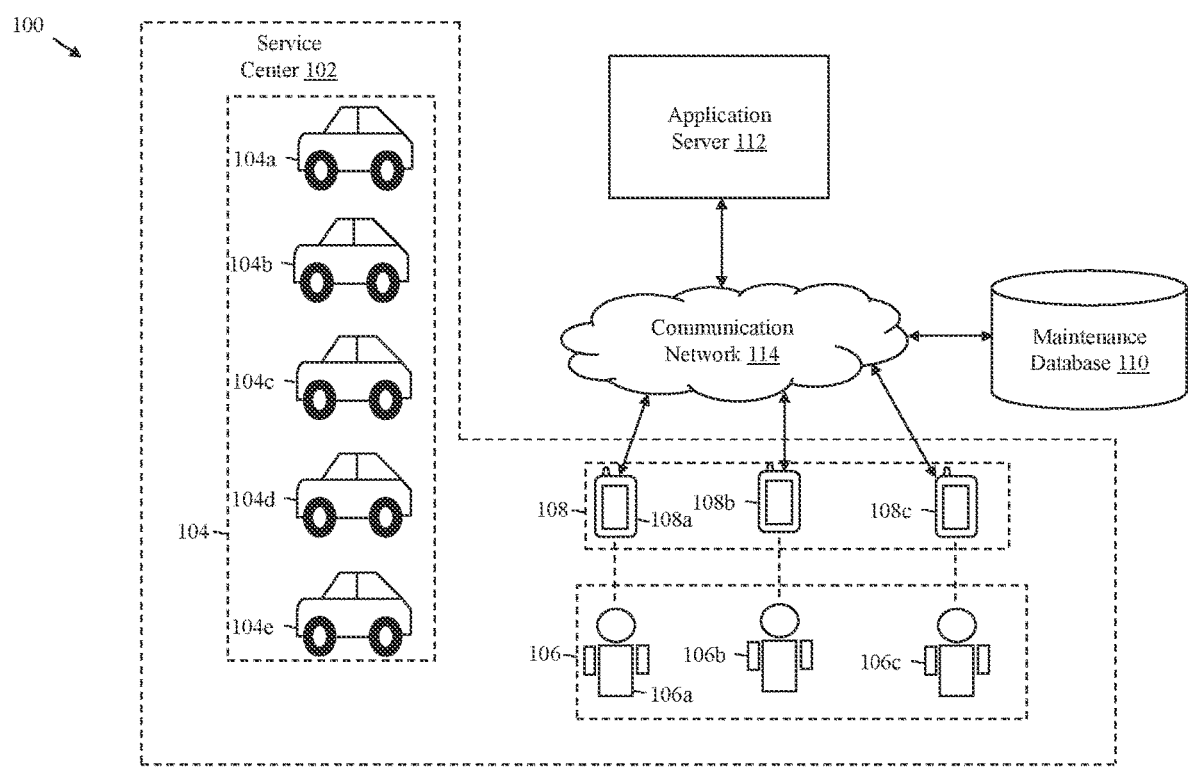
FIG. 1 is a block diagram that illustrates a system environment for facilitating vehicle maintenance at a service center, in accordance with an exemplary embodiment of the present disclosure.

Certain embodiments of the disclosure may be found in disclosed systems and methods for vehicle maintenance at a service center. Exemplary aspects of the disclosure provide methods for vehicle maintenance at the service center. The methods include various operations that are executed by a server (for example, an application server) for vehicle maintenance at the service center. In an embodiment, a set of vehicular datasets, for a set of vehicles that requires servicing and is present at the service center, may be retrieved by a server from a database. Based on the set of vehicular datasets, a service schedule is determined by the server for servicing the set of vehicles by a plurality of operators associated with the service center. The service schedule is indicative of a first sequence for servicing the set of vehicles by the plurality of operators. The servicing of a first subset of the set of vehicles is initiated based on the first sequence by the plurality of operators. A progress of the servicing, of the first subset of the set of vehicles, is monitored by the server based on a plurality of status reports received from a plurality of operator devices of the plurality of operators. Based on the monitored progress, the service schedule for a second subset of the set of vehicles is updated by the server. The servicing for each vehicle of the second subset of the set of vehicles is pending. The updated service schedule is indicative of a second sequence for servicing the second subset of the set of vehicles. The servicing of the second subset of the set of vehicles is initiated based on the second sequence by the plurality of operators.

In some embodiments, the server is further configured to communicate a first set of instructions to each operator device of the plurality of operator devices based on the determined service schedule. The servicing of the first subset of the set of vehicles is initiated by the plurality of operators based on the first set of instructions.

In some embodiments, the server is further configured to determine, based on the set of vehicular datasets, service job data for each vehicle of the set of vehicles. The service job data for each vehicle includes a set of operations to be performed on a corresponding vehicle for servicing the corresponding vehicle. The service job data for each vehicle is included in the first set of instructions communicated to a corresponding operator of the plurality of operators.

In some embodiments, the server is further configured to determine a service time for servicing each vehicle of the set of vehicles based on the service job data determined for the corresponding vehicle.

In some embodiments, the determination of the service schedule is further based on the determined service time for servicing each vehicle of the set of vehicles.

In some embodiments, the determined service schedule is further indicative of one or more operators of the plurality of operators that are allocated to each vehicle of the set of vehicles for servicing.

In some embodiments, the server is further configured to retrieve, from the database, a plurality of operator profiles of the plurality of operators. The one or more operators, of the plurality of operators, are allocated to each vehicle of the set of vehicles based on the plurality of operator profiles.

In some embodiments, the server is further configured to communicate a second set of instructions to each operator device of the plurality of operator devices based on the updated service schedule. The servicing of the second subset of the set of vehicles is initiated by the plurality of operators based on the second set of instructions.

In some embodiments, the server is further configured to receive identification information of the set of vehicles. The retrieval of the set of vehicular datasets is based on the reception of the identification information.

In some embodiments, the determination of the service schedule is further based on a priority level associated with each of the set of vehicles.

The methods and systems of the disclosure provide a solution for vehicle maintenance at a service center. The methods and systems enable determination of a service schedule for a set of vehicles that requires servicing and is present at the service center. The service schedule may be determined such that a total turn-around time for servicing the set of vehicles is minimized. The determination of the service schedule is based on a vehicular dataset of each vehicle at the service center and an operator profile of each operator associated with the service center, enabling optimal allocation of operators to vehicles for servicing. A priority level may be determined for each vehicle of the set of vehicles, enabling preferential servicing of one or more vehicles, of the set of vehicles, in requisite cases. Monitoring of the servicing of the set of vehicles based on status reports, from operator devices of the operators, enables dynamic updating of the service schedule for dealing with changing ground conditions at the service center 102.

FIG. 1 is a block diagram that illustrates a system environment 100 for facilitating vehicle maintenance at a service center, in accordance with an exemplary embodiment of the present disclosure. The system environment 100 includes a service center 102. The system environment 100 further includes a set of vehicles 104 (e.g., first through fifth vehicles 104a-104e) and a plurality of operators 106 (e.g., first through third operators 106a-106c) associated with a plurality of operator devices 108 (e.g., first through third operator devices 108a-108c), respectively. The system environment 100 further includes a maintenance database 110 and an application server 112. The plurality of operator devices 108, the maintenance database 110, and the application server 112 communicate with each other by way of a communication network 114.

The service center 102 is a service and maintenance facility (e.g., a garage or a workshop), where vehicles (e.g., the set of vehicles 104) are serviced and/or repaired by operators (e.g., the plurality of operators 106). The service center 102 may be operated by an original equipment manufacturer (OEM), an entity associated with the OEM, or a third-party service provider. Functions and operations of the service center 102 are well known to those of skill in the art.

The first vehicle 104a is a mode of transport that is utilized by a user (such as a driver or an owner of the first vehicle 104a), to commute from one location to another location. In one embodiment, the first vehicle 104a may be deployed by a service provider, such as a transport aggregator, to provide on-demand vehicle services to one or more users. In another embodiment, the first vehicle 104a may be privately owned by the user and may be used for fulfilling self-travelling requirements. The first vehicle 104a may include, therein, a plurality of vehicular systems. The plurality of vehicular systems may include, but is not limited to, a first air-conditioning system, a first braking system, a first ignition system, a first in-car entertainment (ICE) system, a first lubrication system, a first exhaust system, a first suspension system, a first steering system, or the like. The plurality of vehicular systems may further include a first lighting system, a first electrical system, a first radiator, a first turbocharger, a first traction control system, a first engine, a first drivetrain, or the like. The plurality of vehicular systems included in the first vehicle 104a are well known to those of skill in the art. The first vehicle 104a may further include a plurality of sensors for measuring a health status of the plurality of vehicular systems. The plurality of sensors may include, but are not limited to, position sensors, position switches, limit switches, current sensors, voltage sensors, force sensors, pressure sensors, speed sensors, motor control sensors, airflow sensors, or the like. For example, a first engine of the first vehicle 104a may be equipped with a set of fuel rail pressure sensors, a set of crankshaft position sensors, a set of camshaft position sensors, or the like. In another example, the first suspension system of the first vehicle 104a may include linear position sensors, potentiometers, proximity switches, magneto-restrictive sensors, or the like. Output from each sensor of the plurality of sensors may be communicated, via the communication network 114, by a first on-board diagnostics (OBD) device (not shown) to the maintenance database 110 for storage. In some embodiments, based on the sensor output of each of the plurality of sensors, one or more diagnostic trouble codes (DTCs) may be generated by an electronic control unit (ECU) in the first vehicle 104a. The one or more DTC codes may be communicated, via the communication network 114, to the maintenance database 110 by the first OBD device.

In one embodiment, the second through fifth vehicles 104b-104e may structurally and functionally be similar to the first vehicle 104a. In another, embodiment, the first through fifth vehicles 104a-104e may be vary in terms of vehicle age, vehicle manufacturer, vehicle type, vehicle model, vehicle make, or the like.

The plurality of operators 106 are technicians or workshop specialists associated with the service center 102 (e.g., employed at the service center 102). Service, maintenance, and/or repair of vehicles (e.g., the set of vehicles 104) at the service center 102 may be performed by the plurality of operators 106. For the sake of brevity, the service center 102 is shown to employ or include only three operators (i.e., the first through third operators 106a-106c). It will be apparent to those of skill in the art that the service center 102 may include any number of operators without deviating from the scope of the disclosure.

The first operator device 108a may include suitable logic, circuitry, interfaces, and/or code, executable by the circuitry, that may be configured to perform one or more operations for assisting the first operator 106a in servicing vehicles at the service center 102. For example, the first operator device 108a may be configured to receive, from the application server 112, a set of instructions for servicing a vehicle (e.g., the first vehicle 104a). The first operator device 108a may present, to the first operator 106a, the received set of instructions for servicing the vehicle. The first operator device 108a may communicate, to the application server 112, one or more status reports pertaining to an ongoing service of the vehicle by the first operator 106a. Functionality of the first operator device 108a is explained in conjunction with FIGS. 2A and 2B. Examples of the first operator device 108a may include, but are not limited to, a smartphone, a tablet, a phablet, a laptop, a personal computer, a wearable device, or the like. The second and third operator devices 108b and 108c, associated with the second and third operators 106b and 106c, may be structurally and functionally similar to the first operator device 108a.

The maintenance database 110 may include suitable logic, circuitry, interfaces, and/or code, executable by the circuitry, that may be configured to perform one or more database operations. Examples of the database operations include, but are not limited to, receiving, storing, processing, and transmitting vehicular datasets of vehicles (e.g., the set of vehicles 104) and operator profiles of operators (e.g., the plurality of operators 106). In one embodiment, the maintenance database 110 may store vehicular datasets of each vehicle operated by a transport aggregator.

A vehicular dataset of a vehicle (e.g., the first vehicle 104a) may include, but is not limited to, an asset health index of the vehicle, a probability of failure of each vehicular system or component in the vehicle, an estimated running cost per unit distance of the vehicle, a driver score of a driver associated with the vehicle, or the like. The vehicular dataset of the vehicle may further include a service interval mandated by a manufacturer of the vehicle, a service history of the vehicle, trip data of the vehicle, an odometer reading of the vehicle, a manufacturing date of the vehicle, an age of the vehicle, or the like. The vehicular dataset of the vehicle may further include an output of each sensor of a plurality of sensors in the vehicle, a set of DTCs generated by an ECU in the vehicle, or the like. The vehicular dataset of the vehicle may further include a service procedure for servicing the vehicle (i.e., each vehicular system or component in the vehicle). Data stored in the vehicular dataset may be received by the maintenance database 110 from multiple sources, such as the application server 112, an OBD device in the vehicle, a vehicle device or a driver device in the vehicle, a computing system of the manufacturer of the vehicle, a computing system of a third-party, or the like. The vehicular dataset of the vehicle may be mapped to a vehicle identification number (VIN) of the vehicle or a vehicle registration number on a vehicle registration plate of the vehicle. First through fifth vehicular datasets of the first through fifth vehicles 104a-104e may be similar to the vehicular dataset described above.

An operator profile of an operator (e.g., the first operator 106a) may include, but is not limited to, work timings of the operator, a number of vehicles serviced by the operator, a work history of the operator, one or more areas of expertise (i.e., skill areas) of the operator, or the like. The operator profile may further include an identifier (e.g., a contact number) of an operator device (e.g., the first operator device 108a) associated with the operator. First through third operator profiles, of the respective first through third operators 106a-106c, that are stored in the maintenance database 110 may be similar to the operator profile described above. The maintenance database 110 may be implemented as a cloud-based server. Examples of the maintenance database 110 may include, but are not limited to, Hadoop®, MongoDB®, MySQL®, NoSQL®, and Oracle®. In a non-limiting example, the maintenance database 110 is shown to be maintained outside the service center 102. However, it will be apparent to those of skill in the art that the maintenance database 110 may be maintained locally at the service center 102 without deviating from the scope of the disclosure.

The application server 112 may include suitable logic, circuitry, interfaces, and/or code, executable by the circuitry, that may be configured to perform one or more operations for determining a service schedule for servicing vehicles (e.g., the set of vehicles 104) present at the service center 102. The determination of the service schedule may be based on the first through fifth vehicular datasets of the set of vehicles 104 and the first through third operator profiles of the respective first through third operators 106a-106c. Based on the determined service schedule, the application server 112 may further communicate instructions to the first through third operator devices 108a-108c of the first through third operators 106a-106c for servicing the set of vehicles 104 present at the service center 102. The application server 112 may monitor a progress of the servicing the set of vehicles 104, based on status reports received from the first through third operator devices 108a-108c. The application server 112 may update the determined service schedule based on the monitored progress.

Examples of the application server 112 may include, but are not limited to, a personal computer, a laptop, a mini-computer, a mainframe computer, a cloud-based server, a network of computer systems, or a non-transient and tangible machine executing a machine-readable code. In a non-limiting example, the application server 112 is shown to be located outside the service center 102. However, it will be apparent to those of skill in the art that the application server 112 may be situated at the service center 102 without deviating from the scope of the disclosure. For the sake of brevity, the application server 112 and the maintenance database 110 have been shown as separate systems. However, in some embodiments, the maintenance database 110 may be integrated within the application server 112. In such scenarios, functions performed by the maintenance database 110 may be performed by the application server 112. Further, in another embodiment, the application server 112 may be associated with multiple service centers for organizing and scheduling vehicle maintenance in an optimal manner.

In operation, the application server 112 may receive identification information of the set of vehicles 104 that require servicing and are present at the service center 102. Examples of identification information of a vehicle may include, but are not limited to, a VIN of the vehicle, a vehicle registration number on a vehicle registration plate of the vehicle, or the like. Based on the identification information of the set of vehicles 104, the application server 112 may retrieve, from the maintenance database 110, the first through fifth vehicular datasets of the respective first through fifth vehicles 104a-104e. Further, the application server 112 may retrieve, from the maintenance database 110, the first through third operator profiles of the respective first through third operators 106a-106c.

Based on the first through fifth vehicular datasets, the application server 112 may determine service job data for each of the set of vehicles 104. In other words, the application server 112 may determine, for each vehicle of the set of vehicles 104, the service job data that includes a set of operations to be performed on a corresponding vehicle for servicing the corresponding vehicle. For example, first service job data for the first vehicle 104a may include a first set of operations for servicing the first vehicle 104a. The first set of operations include, but is not limited to, replacement of air filters, replacement of oil filters, repair of one or more vehicular systems, refilling braking fluids, replacing transmission fluids, or the like. Based on the determined service job data for each of the set of vehicles 104, the application server 112 determines service time for servicing each of the set of vehicles 104. The determined service time for each vehicle is an estimated time duration (e.g., "2 hours") required for completing a set of operations on a corresponding vehicle for servicing.

Based on the determined service job data, the determined service time for servicing, the retrieved vehicular datasets, and the retrieved operator profiles, the application server 112 determines a service schedule for servicing the set of vehicles 104. The service schedule is determined such that a total turn-around time (TAT) and a TAT for servicing each vehicle, of the set of vehicles 104, is optimized (i.e., minimized). The TAT for each vehicle is a function of a service time and wait time (starting from a time of arrival of the corresponding vehicle at the service center 102) for the corresponding vehicle. In an example, a first service time determined for the first vehicle 104a is indicative of a time duration required by an operator for performing the first set of operations on the first vehicle 104a. A first wait time for the first vehicle 104a is indicative of a time duration the first vehicle 104a spends waiting at the service center 102 before an operator initiates the first set of operations on the first vehicle 104a. In such a scenario, a TAT for the first vehicle 104a is a sum of the first service time and the first wait time.

The service schedule is indicative of a first sequence for servicing the set of vehicles 104 by the plurality of operators 106. The service schedule is further indicative of an allocation of the plurality of operators 106 for servicing the set of vehicles 104. The allocation of the plurality of operators 106 for servicing the set of vehicles 104 is based on the first through third operator profiles, the first through fifth vehicular datasets, the determined service time for servicing each of the set of vehicles 104, or a combination thereof. Based on the determined service schedule, the application server 112 may communicate to each operator device, of the plurality of operator devices 108, a first set of instructions. The first set of instructions communicated to each operator device, of the plurality of operator devices 108, may include corresponding service job data and corresponding service time for servicing corresponding vehicle(s).

Based on the first set of instructions communicated to each of the plurality of operator devices 108, the servicing of a first subset (e.g., the first through third vehicles 104a-104c), of the set of vehicles 104, may be initiated by the plurality of operators 106 based on the first sequence. The application server 112 may receive, by way of the plurality of operator devices 108, status reports of the servicing of the first subset of the set of vehicles 104. The application server 112 may monitor a progress of the servicing of each of the first subset of the set of vehicles 104, based on the received status reports. Based on the monitored progress, the application server 112 may update the service schedule for a second subset (e.g., the fourth and fifth vehicles 104d and 104e) of the set of vehicles 104. The second subset includes those vehicles, of the set of vehicles 104, for each of which servicing is pending. The updated service schedule is indicative of a second sequence for servicing the second subset of the set of vehicles 104.

Based on the updated service schedule, the application server 112 may communicate, to each operator device of the plurality of operator devices 108, a second set of instructions. Following a completion of the servicing of the first subset of the set of vehicles 104, the servicing of the second subset of the set of vehicles 104 may be initiated by the plurality of operators 106, based on the second set of instructions. The servicing of the second subset of the set of vehicles 104 is initiated, by the plurality of operators 106, based on the second sequence.

Figure 2A:
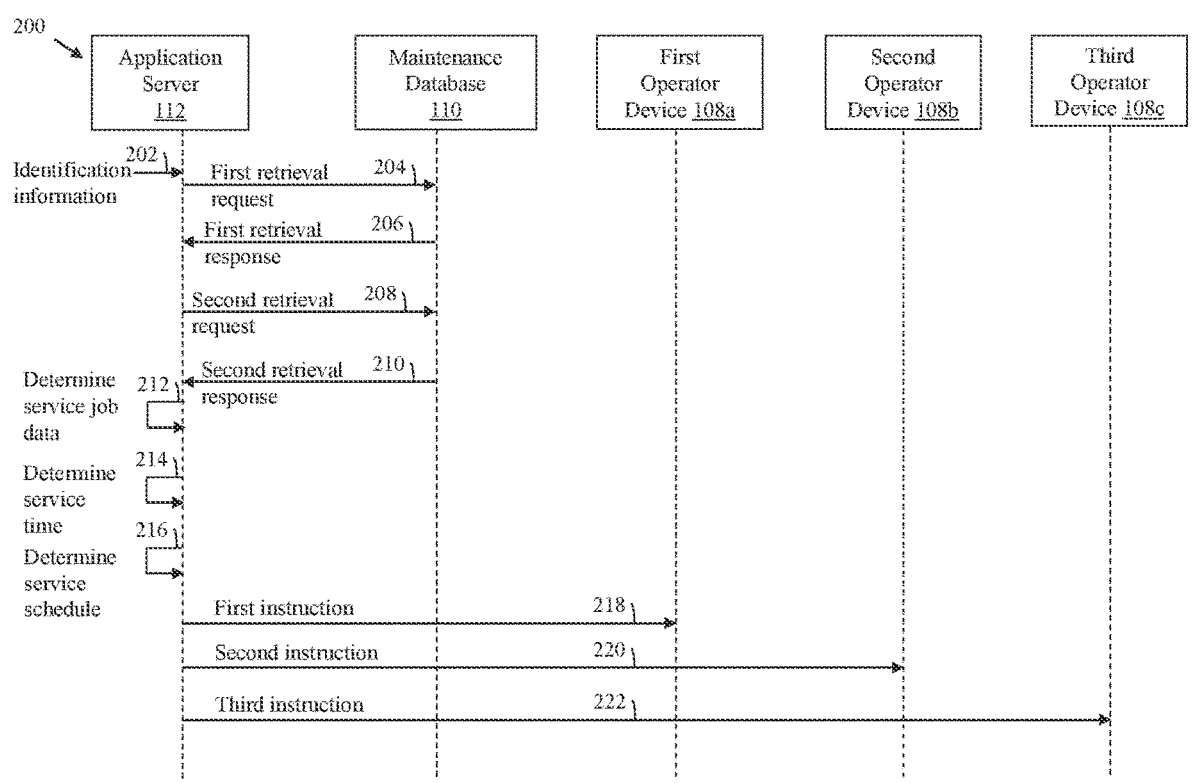
FIGS. 2A and 2B, collectively represent a process flow diagram that illustrates a method for servicing a set of vehicles of FIG. 1 at a service center of FIG. 1, in accordance with an exemplary embodiment of the present disclosure.
Figure 2B:
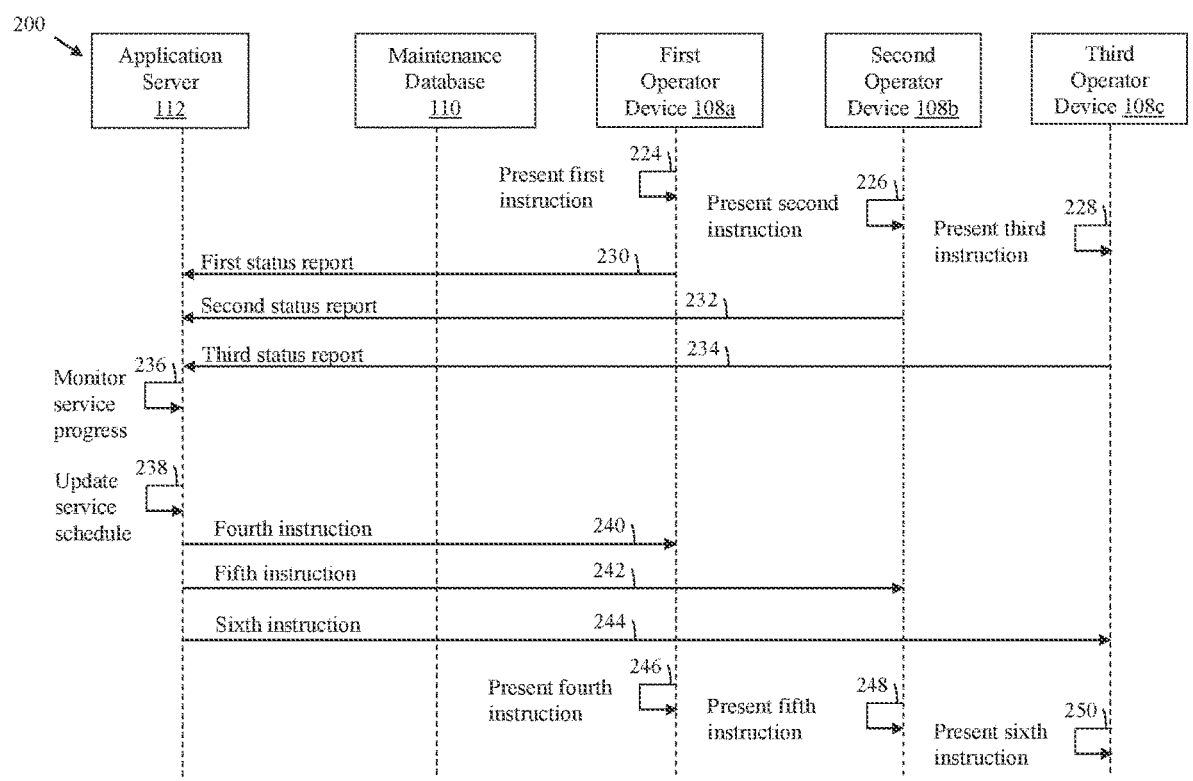

FIGS. 2A and 2B, collectively represent a process flow diagram 200 that illustrates a method for servicing the set of vehicles 104 at the service center 102, in accordance with an exemplary embodiment of the present disclosure.

With reference to FIG. 2A, the application server 112 may receive the identification information of the set of vehicles 104 that is present at the service center 102 and requires servicing (as shown by arrow 202). Examples of the identification information may include, but are not limited to, a VIN of each of the set of vehicles 104, a vehicle registration number on a vehicle registration plate of each of the set of vehicles 104, or the like. It will be apparent to those of skill in the art that the identification information of the set of vehicles 104 may include any identifier that uniquely identifies each vehicle of the set of vehicles 104. The identification information may be received by the application server 112 using various methods and techniques.

In one embodiment, the vehicle registration number or the VIN (i.e., the identification information), of each vehicle of the set of vehicles 104, is manually entered by an operator (e.g., any of the plurality of operators 106), at the service center 102, into a corresponding operator device (e.g., the plurality of operator devices 108). The corresponding operator device may communicate the identification information to the application server 112.

In another embodiment, the service center 102 may include, therein, a computing system (e.g., the plurality of operator devices 108) that employs machine vision (i.e., image recognition) to identify vehicles (e.g., the set of vehicles 104) that arrive at the service center 102 for servicing. The computing system may include one or more cameras configured to capture an image of a vehicle registration plate of each vehicle that arrives at the service center 102 for servicing. The computing system may process the image of the vehicle registration plate of each vehicle to obtain a vehicle registration number of each vehicle. The vehicle registration number of each vehicle (i.e., the identification information of the set of vehicles 104) may then be communicated, by the computing system, to the application server 112 by way of the communication network 114.

In another embodiment, self-service kiosks may be installed at the service center 102. Such self-service kiosks may allow drivers of vehicles (e.g., the set of vehicles 104) or operators (e.g., the plurality of operators 106) to enter, into the self-service kiosks, a vehicle registration number or a VIN (i.e., the identification information) of each vehicle. The kiosks may communicate the entered identification information to the application server 112 by way of the communication network 114.

Based on the received identification information of the set of vehicles 104, the application server 112 may communicate a first retrieval request for retrieving the first through fifth vehicular datasets from the maintenance database 110 (as shown by arrow 204). The first retrieval request may include the identification information of the set of vehicles 104. The maintenance database 110 may retrieve the first through fifth vehicular datasets based on the identification information. Based on the retrieved first through fifth vehicular datasets, the maintenance database 110 may communicate a first retrieval response to the application server 112 (as shown by arrow 206). The first retrieval response may include the first through fifth vehicular datasets stored in the maintenance database 110.

As described in the foregoing description of FIG. 1, a vehicular dataset (e.g., the first vehicular dataset) of a vehicle (e.g., the first vehicle 104a) may include, but is not limited to, an asset health index of the vehicle, a failure probability of each vehicular system or component in the vehicle, or a driver score for a driver of the vehicle. The vehicular dataset of the vehicle may further include a running cost per unit distance of the vehicle, a service interval mandated by a manufacturer of the vehicle, a set of operations listed by the manufacturer for servicing the vehicle, or the like. The set of operations may include operations that are to be performed during a routine service of the vehicle. Such operations may include, but are not limited to, replacing an engine oil filter of the vehicle, changing engine oil in an engine oil tank of the vehicle, performing wheel-alignment, replacing coolant in a coolant tank of the vehicle, for the vehicle, or the like. The set of operations may further include operations for repairing various vehicular systems or components (e.g., braking system, clutch, or the like) in the vehicle. The first through fifth vehicular datasets are explained in conjunction with FIG. 3.

Referring now to FIG. 3, a table 300 that illustrates the first through fifth vehicular datasets, in accordance with an exemplary embodiment of the present disclosure, is shown. The table 300 includes columns 302a-302f and rows 304a-304e. The columns 302a-302c indicate the identification information of the set of vehicles 104, an asset health index of the set of vehicles 104, a probability of failure of a braking system in the set of vehicles 104, respectively. The columns 302d-302e indicate driver scores of drivers of the set of vehicles 104, a running cost per unit distance of the set of vehicles 104, and a mandated service interval of the set of vehicles 104, respectively. The rows 304a-304e are indicative of the first through fifth vehicular datasets corresponding to the first through fifth vehicles 104a-104e, respectively.

It will be apparent to those of skill in the art that the first through fifth vehicular datasets shown in the table 300 are merely exemplary and that the first through fifth vehicular datasets may include other information (e.g., health statuses of other vehicular systems, service history, generated DTC codes, or the like) as described in the foregoing description of FIG. 1. However, for the sake of brevity, this information has not been shown in FIG. 3.

An asset health index of a vehicle (e.g., the first vehicle 104a) is indicative of an overall health status of the vehicle and is expressed as a score out of, for example, 100. A higher asset health index is indicative of a better health status of the vehicle. The asset health index of the vehicle may be a function of a health status of each vehicular system or component in the vehicle. Probability of failure of a braking system in a vehicle (e.g., the first vehicle 104a) is indicative of a current health status of the braking system in the vehicle. In other words, higher the probability of failure of the braking system in the vehicle, higher is the likelihood that the braking system in the vehicle is currently faulty. A driver score of a vehicle (e.g., the first vehicle 104a) is expressed as a score out of, for example, 100 and is indicative of a driver behavior of a driver of the vehicle. A higher driver score corresponds to better driving behavior. Good driving behavior may be characterized by use of defensive driving techniques, linear or non-aggressive acceleration, linear or non-aggressive braking, or the like. A running cost per unit distance of a vehicle (e.g., the first vehicle 104a) is expressed as cost per kilometer (km) of running or operating the vehicle. The running cost per unit distance of the vehicle may be a function of a cost of servicing the vehicle, a distance that may be travelled between successive servicing sessions as mandated by a manufacturer of the vehicle, a fuel economy of the vehicle, a fuel cost, or the like. A mandated service interval of a vehicle (e.g., the first vehicle 104a) is expressed in kms and is indicative of service interval prescribed by a manufacturer of the vehicle. In other words, the mandated service interval of the vehicle refers to a distance that may be travelled by the vehicle before requiring servicing.

The row 304a is indicative of the first vehicular dataset. The row 304a indicates that the first vehicle 104a has an asset health index of "93", a probability of failure of the first braking system of "23%", a driver score of "82", a running cost per unit distance (i.e., cost per km) of "$0.11", and a mandated service interval of "8,000" km. The asset health index "93" of the first vehicle 104a implies that the first vehicle 104a is in relatively good health. The probability of failure of the braking system "23%" in the first vehicle 104a, implies that the braking system in the first vehicle 104a has a relatively low chance of failure, and is, therefore, likely to be in good health. Therefore, no servicing and/or repair of the first braking system in the first vehicle 104a may be required. The driver score "82" of the first vehicle 104a is relatively high and indicates that the first vehicle 104a has been driven sedately or non-aggressively by corresponding driver. The mandated service interval of the first vehicle 104a indicates that the first vehicle 104a is to be serviced every "8,000" km.

The row 304b is indicative of the second vehicular dataset. The row 304b indicates that the second vehicle 104b has an asset health index of "87", a braking system failure probability of "47%", a driver score of "88", a running cost per unit distance (i.e., cost per km) of "$0.87", a mandated service interval of "12,000" km. The asset health index "87" of the second vehicle 104b implies that the second vehicle 104b is in relatively good health. The probability of failure of the braking system "47%" in the second vehicle 104b, implies that the braking system in the second vehicle 104b has a relatively low chance of failure, and is, therefore, likely to be in good health. Therefore, servicing and/or repair of the braking system of the second vehicle 104b may not be required. The driver score "88" of the second vehicle 104b is relatively high and indicates that the second vehicle 104b has been driven sedately or non-aggressively. The mandated service interval of the second vehicle 104b indicates that the second vehicle 104b is to be serviced every "12,000" km.

The row 304c is indicative of the third vehicular dataset. The row 304c indicates that the third vehicle 104c has an asset health index of "75", a probability of failure of a braking system of "68%", a driver score of "78", a running cost per unit distance (i.e., cost per unit km) of "$0.3", a mandated service interval of "10,000" km. The asset health index "75" of the third vehicle 104c implies that the third vehicle 104c is in relatively good health. The probability of failure of the braking system "68%" in the third vehicle 104c, implies that the braking system in the third vehicle 104c has a relatively high chance of failure, and is, therefore, likely to be in poor health. Therefore, servicing and/or repair of the braking system in the third vehicle 104c may be warranted. The driver score "78" of the third vehicle 104c is relatively high and indicates that the first vehicle 104a has been driven sedately or non-aggressively. The mandated service interval of the third vehicle 104c indicates that the third vehicle 104c is to be serviced every "10,000" km.

The row 304d is indicative of the fourth vehicular dataset. The row 304d indicates that the fourth vehicle 104d has an asset health index of "66", a probability of failure of a braking system of "88%", a driver score of "54", a running cost per unit distance (i.e., cost per unit km) of "$1.2", a mandated service interval of "6,500" km. The asset health index "66" of the fourth vehicle 104d implies that the fourth vehicle 104d is in moderate health. The probability of failure of the braking system "88%" in the fourth vehicle 104d, implies that the braking system in the fourth vehicle 104d has a high chance of failure, and is, therefore, likely to be in poor health. Therefore, servicing and/or repair of the braking system in the fourth vehicle 104d may be warranted. The driver score "54" of the fourth vehicle 104d indicates that the fourth vehicle 104d may have been driven poorly by a driver of the fourth vehicle 104d. The mandated service interval of the fourth vehicle 104d indicates that the fourth vehicle 104d is to be serviced every "6,500" km.

The row 304e is indicative of the fifth vehicular dataset. The row 304e indicates that the fifth vehicle 104e has an asset health index of "68", a probability of failure of a braking system of "75%", a driver score of "75", a running cost per unit distance (i.e., cost per unit km) of "$1.8", a mandated service interval of "10,000" km. The asset health index of the fifth vehicle 104e implies that the fifth vehicle 104e "68" is in moderate health. The probability of failure of the braking system "75" in the fifth vehicle 104e, implies that the braking system in the fifth vehicle 104e has a high chance of failure, and is, therefore, likely to be in poor health. Therefore, servicing and/or repair of the braking system in the fifth vehicle 104e may be warranted. The driver score "68" of the fourth vehicle 104d indicates that the fifth vehicle 104e may have been driven neither aggressively nor sedately by a driver of the fifth vehicle 104e. The mandated service interval of the fifth vehicle 104e indicates that the fourth vehicle 104d is to be serviced every "10,000" km.

Referring back to FIG. 2A, the application server 112 may further communicate a second retrieval request to the maintenance database 110 for operator profiles of operators associated with the service center 102 (as shown by arrow 208). Based on the second retrieval request, the maintenance database 110 may communicate a second retrieval response to the application server 112 (as shown by arrow 210). The second retrieval response may include the first through third operator profiles of the respective first through third operators 106a-106c. The first through third operator profiles are explained in conjunction with FIG. 4.

Figure 4:
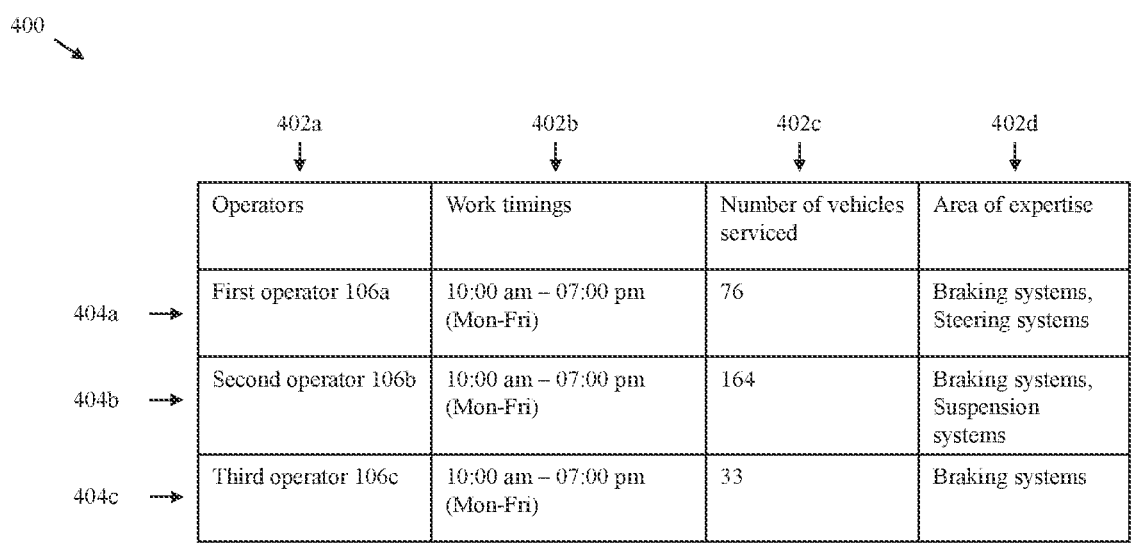
FIG. 4 represents a table that illustrates the operator profiles of a plurality of operators of FIG. 1, in accordance with an exemplary embodiment of the present disclosure.

Referring now to FIG. 4, a table 400 that illustrates the first through third operator profiles of the respective first through third operators 106a-106c in accordance with an exemplary embodiment of the present disclosure, is shown. The table 400 includes columns 402a-402d and rows 404a-404c. The columns 402a-402d indicate the plurality of operators 106, work timings or availability of each of the plurality of operators 106, a number of vehicles serviced by each of the plurality of operators 106, and an area of expertise of each of the plurality of operators 106, respectively. The rows 404a-404c indicate the first through third operator profiles, respectively.

The row 404a indicates that the first operator 106a is available on Mondays to Fridays from 10:00 am to 07:00 pm. The row 404a further indicates that the first operator 106a has serviced a total of 76 vehicles till date and that the first operator 106a is an expert in servicing braking and steering systems in vehicles. The row 404b indicates that the second operator 106b is available on Mondays to Fridays from 10:00 am to 7:00 pm. The row 404b further indicates that the second operator 106b has serviced a total of 164 vehicles till date and that the second operator 106b is an expert in servicing braking systems and suspension systems in vehicles. The row 404c indicates that the third operator 106c is available on Mondays to Fridays from 10:00 am to 7:00 pm. The row 404c further indicates that the third operator 106c has serviced a total of 33 vehicles till date and that the third operator 106c an expert in servicing braking systems in vehicles.

It will be apparent to those of skill in the art that the first through third operator profiles shown in the table 400 are merely exemplary. In an actual implementation, each of the first through third operator profiles may also include other information (e.g., a designation, an hourly wage rate, or the like) pertaining to a corresponding operator.

Referring back to FIG. 2A, based on the first through fifth vehicular datasets included in the received first retrieval response, the application server 112 may determine the first through fifth service job data for the first through fifth vehicles 104a-104e, respectively (as shown by arrow 212). Service job data for a vehicle is indicative of a set of operations to be performed, by an operator, on the vehicle for servicing the vehicle. For example, based on the high asset health index of the first vehicle 104a and a low probability of failure for each vehicular system (e.g., the braking system in the first vehicle 104a) or component in the first vehicle 104a, the application server 112 may determine a first set of operations for servicing the first vehicle 104a. Since the first vehicle 104a and each vehicular system or component in the first vehicle 104a is in good health, the first set of operations may only include routine service operations or procedures (e.g., oil change, oil filter change, coolant replacement, or the like) as prescribed by a manufacturer of the first vehicle 104a. The first set of operations may not include any operations for replacement or repair of the vehicular systems or components in the first vehicle 104a.

Based on the high asset health index of the second vehicle 104b and a low probability of failure for each vehicular system (e.g., the braking system in the second vehicle 104b) or component in the second vehicle 104b, the application server 112 may determine a second set of operations for servicing the second vehicle 104b. Since the second vehicle 104b and each vehicular system or component in the second vehicle 104b is in good health, the second set of operations may include routine operations (e.g., oil change, oil filter change, coolant replacement, or the like) as prescribed by a manufacturer of the second vehicle 104b. The second set of operations may not include any operations for replacement or repair of the vehicular systems or components in the second vehicle 104b. Similarly, the application server 112 may determine third through fifth sets of operations to be performed on the third through fifth vehicles 104c-104e, by an operator, for servicing the third through fifth vehicles 104c-104e, respectively. For a vehicle with a low asset health index and/or a high probability of failure for one or more vehicular systems or components, a corresponding set of operations (e.g., the fourth set of operations or the fifth set of operations) may include one or more operations for repairing or servicing the one or more vehicular systems. The corresponding set of operations may include the one or more operations, in addition to routine service operations or procedures prescribed by a corresponding manufacturer. For example, the fourth set of operations may include one or more operations for servicing the braking system in the fourth vehicle 104d and routine service operations or procedures prescribed by a manufacturer of the fourth vehicle 104d.

Based on the determined first through fifth service job data, the application server 112 may determine a service time for servicing each of the set of vehicles 104 (as shown by arrow 214). In other words, the application server 112 may determine first through fifth service times for servicing the set of vehicles 104, respectively. For the sake of brevity, it is assumed that at any time-instance only a single operator services a vehicle. Therefore, the first through fifth service times, each, refer to a time duration that may be taken by a single operator to service the first through fifth vehicles 104a-104e, respectively. For example, the first service time for servicing the first vehicle 104a may be indicative of a time (e.g., 2 hours) that may be taken by an operator for performing the first set of operations on the first vehicle 104a. A second service time for servicing the second vehicle 104b may be indicative of a time (e.g., 2 hours) that may be taken by an operator to perform the second set of operations on the second vehicle 104b. The determination of the first through fifth service times may be based on manufacturer-prescribed service timings included in the first through fifth vehicular datasets and/or historical service data of vehicles available with the application server 112. For example, the historical service data may indicate that for performing the first set of operations on a vehicle in the past took 2 hours. Thus, the first service time based on the historical service data is determined to be 2 hours for the first vehicle 104a.

Further, the application server 112 may determine first through fifth priority levels for servicing the first through fifth vehicles 104a-104e, respectively, based on various parameters. The first through fifth priority levels are indicative of a sequence or an order in which the first through fifth vehicles 104a-104e are to be serviced by the plurality of operators 106. The various parameters may include, but are not limited to, the driver score of each of the set of vehicles 104, the running cost per unit distance of each of the set of vehicles 104, the service history (e.g., a number of services performed as per mandated service interval) of each of the set of vehicles 104, or the like. For example, a vehicle having a higher driver score may be assigned a higher priority level than a vehicle having a lower driver score.

Similarly, a vehicle having a lower running cost per unit distance may be assigned a higher priority level than a vehicle having a higher running cost per unit distance. Similarly, a vehicle having a history of timely servicing (as per a corresponding mandated service interval) may be assigned a higher priority level than a vehicle without a history of timely servicing. In one embodiment, the application server 112 may determine a vehicle score for each of the set of vehicles 104 based on a corresponding driver score, a corresponding running cost per unit distance, a corresponding service history, or the like. Various parameters (e.g., driver score, running cost per unit distance, service history, or the like), included in the first through fifth vehicular datasets, may be assigned different weights for a purpose of determining the vehicle score of each of the set of vehicles 104. The vehicle score for each vehicle, of the set of vehicles 104, may be a function of a value of the various parameters, included in a corresponding vehicular dataset, and the weight assigned to each parameter. In one embodiment, a vehicle with a higher vehicle score may be accorded (or assigned) a higher priority level. The determination of the first through fifth priority levels may be based on the vehicle score determined for each of the set of vehicles 104. The first through fifth service times and the first through fifth priority levels are explained in conjunction with FIG. 5.

Figure 5:
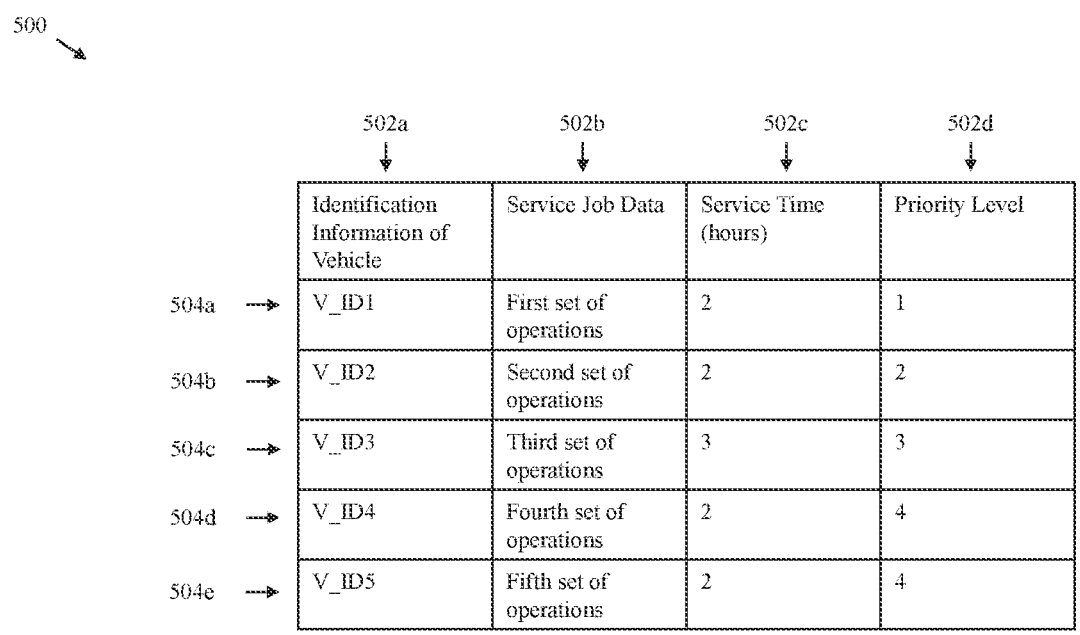
FIG. 5 represents a table that illustrates service job data for servicing the set of vehicles, service times for servicing the set of vehicles, and priority levels associated with the set of vehicles, in accordance with an exemplary embodiment of the present disclosure.

Referring now to FIG. 5, a table 500 that illustrates the first through fifth service job data, the first through fifth service times, and the first through fifth priority levels, in accordance with an exemplary embodiment of the present disclosure, is shown. The table 500 includes columns 502a-502d and rows 504a-504e. Columns 502a-502d indicate the identification information of the set of vehicles 104, the determined first through third service job data, the determined first through fifth service times, and the determined first through the third priority levels, respectively.

The row 504a indicates the first service job data includes the first set of operations that are to be performed on the first vehicle 104a for servicing the first vehicle 104a. The row 504a further indicates that the first service time for performing the first set of operations on the first vehicle 104a is "2 hours". In other words, the first vehicle 104a is to be serviced in 2 hours. The row 504a further indicates that the first priority level of the first vehicle 104a is "1", implying that the first vehicle 104a is to be serviced prior to any other vehicle (i.e., the second through fifth vehicles 104b-104e).

The row 504b indicates the second service job data includes the second set of operations that are to be performed on the second vehicle 104b for servicing the second vehicle 104b. The row 504b further indicates that the second service time for performing the second set of operations on the second vehicle 104b is "2 hours". In other words, the second vehicle 104b is to be serviced in 2 hours. The row 504b further indicates that the second priority level of the second vehicle 104b is "2", implying that the second vehicle 104b is to be serviced after the first vehicle 104a, but prior to any of the third through fifth vehicles 104c-104e.

The row 504c indicates the third service job data that includes a third set of operations that are to be performed on the third vehicle 104c for servicing the third vehicle 104c. The row 504c further indicates that the third service time for performing the third set of operations on the third vehicle 104c is "3 hours". In other words, the third vehicle 104c is to be serviced in 3 hours. The row 504c further indicates that the third priority level of the third vehicle 104c is "3", implying that the third vehicle 104c is to be serviced after the second vehicle 104b, but prior to the fourth and fifth vehicles 104d and 104e.

The row 504d indicates the fourth service job data that includes a fourth set of operations that are to be performed on the fourth vehicle 104d for servicing the fourth vehicle 104d. The row 504d further indicates that the fourth service time for performing the fourth set of operations on the fourth vehicle 104d is "2 hours". In other words, the fourth vehicle 104d is to be serviced in 2 hours. The row 504d further indicates that the fourth priority level of the fourth vehicle 104d is "4", implying that the fourth vehicle 104d is to be serviced after the third vehicle 104c.

The row 504e indicates the fifth service job data that includes a fifth set of operations that are to be performed on the fifth vehicle 104e for servicing the fifth vehicle 104e. The row 504e further indicates that the fifth service time for performing the fifth set of operations on the fifth vehicle 104e is "2 hours". In other words, the fifth vehicle 104e is to be serviced in 2 hours. The row 504e further indicates that the fifth priority level of the fifth vehicle 104e is "4", implying that the fifth vehicle 104e is to be serviced after the third vehicle 104c. In a non-limiting example, the application server 112 determines a same priority level (i.e., "4") for both the fourth and fifth vehicles 104d-104e, indicating that the fourth and fifth vehicles 104d and 104e may be serviced in any order.

The first through fifth service times and the first through fifth priority levels shown in the table 500 are merely exemplary. In an actual implementation, the first through fifth service times and the first through fifth priority levels may vary without deviating from the scope of the disclosure.

Referring back to FIG. 2A, based on the first through third operator profiles, the first through fifth service job data, the first through fifth service times, and the first through fifth priority levels, the application server 112 determines a service schedule for servicing the set of vehicles 104 by the plurality of operators 106 (as shown by arrow 216). The determination of the service schedule may be based on various techniques for meta-heuristics optimization. The various techniques may include, but are not limited to, variable neighborhood search, simulated annealing, tabu search, iterated local search, genetic algorithms, or the like. The various techniques may be applied, for determining the service schedule, with an objective to optimize (i.e., minimize) a total TAT for servicing the set of vehicles 104. The determination of the service schedule may be subject to various constraints such as, but not limited to, the first through fifth service times, the first through fifth priority levels, work timings of the plurality of operators 106, areas of expertise of each of the plurality of operators 106, or the like. The application server 112 may, based on the various techniques, allocate the plurality of operators 106 for the servicing of the set of vehicles 104. The determined service schedule is indicative of a first sequence for servicing the set of vehicles 104 by the plurality of operators 106. In some embodiments, multiple operators may be allocated to a single vehicle for quicker servicing. However, for the sake of brevity, in the current embodiment, each vehicle is allocated a single operator for servicing.

In one embodiment, the determined service schedule indicates that the first through fifth vehicles 104a-104e are to be serviced in the first sequence. However, since the plurality of operators includes three operators (i.e., the first through third operators 106a-106c), the servicing of the first through third vehicles 104a-104c, having the three highest priority levels, may be initiated concurrently by the plurality of operators 106. The servicing of the fourth and fifth vehicles 104d and 104e may be initiated by the first and second operators 106a and 106b, after the servicing of the first and second vehicles 104a and 104b. The determined service schedule is explained in conjunction with FIG. 6.

Referring now to FIG. 6, a table 600 that illustrates the determined service schedule for servicing the set of vehicles 104 in accordance with an exemplary embodiment of the present disclosure, is shown. The table 600 includes columns 602a-602f and rows 604a-604c. The columns 602a-602f are each indicative of one or more vehicles that are to be serviced in a corresponding one-hour time slot, from 10:00 am to 03:00 pm. The rows 604a-604c are indicative of a sequence in which the first through third operators 106a-106c are to service the set of vehicles 104.

The row 604a indicates that the first operator 106a is to initiate the servicing of the first vehicle 104a at 10:00 am and conclude the servicing of the first vehicle 104a by 12:00 pm. The row 604b indicates that the second operator 106b is to initiate the servicing of the second vehicle 104b at 10:00 am and conclude the servicing of the second vehicle 104b by 12:00 pm. The row 604c indicates that the third operator 106c is to initiate the servicing of the third vehicle 104c at 10:00 am and conclude the servicing of the third vehicle 104c by 01:00 pm. The rows 604a further indicate that the first operators 106a is to initiate the servicing of the fourth vehicle 104d at 12:00 pm and conclude the servicing of the fourth vehicle 104d by 02:00 pm. The row 604b further indicates that the second operator 106b is to initiate the servicing of the fifth vehicle 104e at 12:00 pm and conclude the servicing of the fifth vehicle 104e by 02:00 pm.

Thus, the first sequence indicates that the servicing of the first through third vehicles 104a-104s is to be initiated concurrently at 10:00 am by the respective first through third operators 106a-106c. Further, as per the first sequence, servicing of the fourth vehicle 104d and fifth vehicle 104e are to be initiated concurrently at 12:00 pm by the respective first and second operators 106a and 106b.

The first service time for servicing the first vehicle 104a is "2 hours" (i.e., from 10:00 am to 12:00 pm). In non-limiting example, the first through fifth vehicles 104a-104e are assumed to have arrived at the service center 102 at 10:00 am. Therefore, a first wait time for the first vehicle 104a is "0 hours". Therefore, an estimated first TAT (the first service time+the first wait time) for servicing the first vehicle 104a is "2 hours". Similarly, the second service time for servicing the second vehicle 104b is "2 hours" (i.e., from 10:00 am to 12:00 pm). A second wait time for the second vehicle 104b is "0 hours". Therefore, an estimated second TAT (the second service time+the second wait time) for servicing the second vehicle 104b is "2 hours". Similarly, the third service time for servicing the third vehicle 104c is "3 hours" (i.e., from 10:00 am to 01:00 pm). A third wait time for the third vehicle 104c is "0 hours". Therefore, an estimated third TAT (the third service time+the third wait time) for servicing the third vehicle 104c is "3 hours". The fourth service time for servicing the fourth vehicle 104d is "2 hours" (i.e., from 12:00 pm to 02:00 pm). A fourth wait time for the fourth vehicle 104d is "2 hours" (i.e., 10:00 am to 12:00 pm). Therefore, an estimated fourth TAT (the fourth service time+the fourth wait time) for servicing the fourth vehicle 104d is "4 hours". The fifth service time for servicing the fifth vehicle 104e is "2 hours" (i.e., from 12:00 pm to 02:00 pm). A fifth wait time for the fifth vehicle 104e is "2 hours" (i.e., 10:00 am to 12:00 pm). Therefore, an estimated fifth TAT (the fifth service time+the fifth wait time) for servicing the fifth vehicle 104e is "4 hours". Therefore, the total TAT for servicing the set of vehicles 104 is "4 hours" (i.e., 10:00 am to 02:00 pm).

The service schedule illustrated by the table 600 is merely exemplary. It will apparent to those of skill in the art that the service schedule may vary, from that illustrated by the table 600, without deviating from the scope of the disclosure.

Referring back to FIG. 2A, based on the determined service schedule (i.e., table 600), the application server 112 may communicate first through third instructions (i.e., a first set of instructions) to the first through third operator devices 108a-108c, respectively (as shown by arrows 218-222). Each instruction of the first through third instructions may be indicative of a vehicle to be serviced next by a corresponding operator, a determined service time for servicing a corresponding vehicle, and service job data for the corresponding vehicle. For example, the first instruction, communicated to the first operator device 108a may indicate that the first operator 106a is to initiate the servicing of the first vehicle 104a at 10:00 am. The first instruction may further include the first service time (i.e., 2 hours) and the first service job data that includes the first set of operations. The format of the second and third instructions may be similar to the first instruction.

With reference to FIG. 2B, based on the first instruction, the first operator device 108a may present the first instruction on a corresponding first display (as shown by arrow 224). Similarly, the second and third operator devices 108b and 108c may present the second and third instructions on corresponding second and third displays (as shown by arrows 226 and 228). Based on the presented first through third instructions, the servicing of the first through third vehicles 104a-104c (i.e., a first subset of the set of vehicles 104) may be initiated by the respective first through third operators 106a-106c based on the first sequence, Each operator device of the plurality of operator devices 108 may be configured to record a progress of servicing of a vehicle by a corresponding operator.

In one embodiment, the first operator device 108a may be configured to present on a user interface rendered on the first display, a set of options for selection by the first operator 106a. The set of options, selectable by the first operator 106a, may be used to indicate completion of the first set of operations (e.g., "engine oil change", "engine oil filter replacement, or "braking system repair") included the first service job data. For example, if the first set of operations includes a first operation to be performed for changing the engine oil in the first vehicle 104a, the set of options may include a first option for indicating that the first operation is completed on the first vehicle 104a. During the servicing of the first vehicle 104a, upon completion of the first operation, the first operator 106a may select the first option to record the completion of the first operation. Similarly, the set of options may include each operation included in the first set of operations. During the servicing of the first vehicle 104a, upon completion of each operation included in the first set of operations, a corresponding option of the set of options may be selected by the first operator 106a to record the completion of the corresponding operation.

In another embodiment, the first operator device 108a may be configured to receive voice data from the first operator 106a for recording the progress of the servicing of the first vehicle 104a. In other words, the first operator device 108a may be configured to receive speech messages (e.g., "oil change complete", "braking system repaired", or the like) from the first operator 106a during the servicing of the first vehicle 104a. In such a scenario, the first operator device 108a may include circuitry for processing the speech messages (e.g., circuitry for natural language processing).

The first operator device 108a may record, based on the processed speech messages, the progress of the servicing of the first vehicle 104a.

In another embodiment, the first operator device 108a may be configured to receive, by way of one or more cameras, a video feed of the first operator 106a servicing the first vehicle 104a. In such a scenario, the first operator device 108a may include circuitry for video recognition, enabling the first operator device 108a to process the video feed and record the progress (e.g., "oil change complete", "braking system repaired", or the like) of the servicing of the first vehicle 104a. The progress of the servicing of the second and third vehicles 104b and 104c may recorded by the second and third operator devices 108b and 108c in a similar manner.

Based on the recorded progress of the servicing of each of the first through third vehicles 104a-104c, the first through third operator devices 108a-108c may communicate first through third status reports to the application server 112 (as shown by arrows 230-234). For the sake of brevity, the first through third operator devices 108a-108c are shown to communicate only the first through third status reports (i.e., one status report per operator device). However, in an actual implementation, each operator device of the plurality of operator devices 108 may periodically communicate status reports to the application server 112 over a course of the servicing of the first through third vehicles 104a-104c. For example, the first operator device 108a may communicate a status report to the application server 112 whenever an operation of the first set of operations is complete. Similarly, the first operator device 108a may communicate another status report to the application server 112 whenever an operation of the second set of operations is complete.

The application server 112 may monitor the progress of the servicing of the first through third vehicles 104a-104c (i.e., the first subset of the set of vehicles 104), based on the received first through third status reports (as shown by arrow 236). For monitoring the progress, the application server 112 may determine, based on received status reports (e.g., the first through third status reports), whether the servicing of each of the first through third vehicles 104a-104c is on track for completion as per the first through third service times, respectively. For example, based on the first status report, the application server 112 may determine whether the servicing is likely to be over by 12:00 pm (as determined in the service schedule). In one non-limiting example, based on the first status report, the application server 112 may determine that the servicing of the first vehicle 104a is delayed and is likely to be concluded by 02:00 pm. The determination that the servicing of the first vehicle 104a is delayed may be based on a comparison, by the application server 112, of the first set of operations and the first status report. For example, the first set of operations may include first through tenth operations that are to be completed for servicing the first vehicle 104a. However, the first status report may indicate the completion of only the first operation, of the first through tenth operations. Consequently, the application server 112 may estimate a time duration for completing the remaining second through tenth operations by the first operator 106a, and may determine, based on the estimation, that the second through tenth operations are likely to be complete by 02:00 pm.

Deviation of an actual service time of the first vehicle 104a (i.e., delay in completing the servicing of the first vehicle 104a) from the determined first service time (i.e., 2 hours for servicing the first vehicle 104a) may be based on various factors. The various factors may include, but are not limited to, inaccurate determination of the first service job data, inaccurate determination of the first service time, or the like. The various factors may further include discovery by the first operator 106a of one or more vehicular systems or components, in the first vehicle 104a, requiring servicing and not originally detected by or reported to the application server 112 based on the first vehicular dataset.

The application server 112 may update the service schedule (as shown in table 600) based on any deviation (e.g., a delay) in ground conditions from the determined service schedule. Based on the determination that the servicing of the first vehicle 104a is delayed, the application server 112 may update the service schedule (as shown by arrow 238). In other words, based on the determination that the servicing of the first vehicle 104a is likely to conclude by 02:00 pm, the application server 112 determines an updated service schedule for servicing a second subset of the set of vehicles 104. The second subset, of the set of vehicles 104, includes the fourth vehicle 104d and the fifth vehicle 104e (i.e., vehicles, of the set of vehicles 104, for each of which servicing is pending). The application server 112 may update the service schedule at any time-instance after the reception of the first status report. In a non-limiting example, the application server 112 updates the service schedule at 11:00 pm. The application server 112 may update the service schedule based on the various techniques for meta-heuristics optimization. A revised service time (i.e., 4 hours) for servicing the first vehicle 102a may be introduced as a new constraint for updating the service schedule. The updated service schedule may be indicative of a second sequence for servicing the second subset of the set of vehicles 104. The updated service schedule is explained in conjunction with FIG. 7.

Referring now to FIG. 7, a table 700 that illustrates the updated service schedule in accordance with an exemplary embodiment of the present disclosure, is shown. The table 700 includes columns 702a-702f and rows 704a-704c. The columns 702a-702f are each indicative of one or more vehicles that are to be serviced in a corresponding one-hour time slot, from 10:00 am to 03:00 pm. The rows 704a-704c are indicative of a sequence in which the first through third operators 106a-106c are to service the set of vehicles 104.

The row 704a indicates that that the first operator 106a is to conclude the servicing of the first vehicle 104a by 02:00 pm. Further, the row 704c of the updated schedule indicates that the fourth vehicle 104d is now to be serviced by the third operator 106c, instead of the first operator 106a. The servicing of the fourth vehicle 104d is to be initiated by the third operator 106c at 01:00 pm, after the completion of the servicing of the third vehicle 104c by the third operator 106c. Thus, the second sequence in the updated service schedule indicates that the servicing of the fourth vehicle 104d is to be initiated by the third operator 106c at 01:00 pm, after the initiation of the servicing of the fifth vehicle 104e by the second operator 106b at 12:00 pm.

Referring back to FIG. 2B, based on the updated service schedule, the application server 112 may communicate fourth through sixth instructions (i.e., a second set of instructions) to the first through third operator devices 108a-108c, respectively (as shown by arrow 240-244). The fourth instruction may indicate a new service time (i.e., the revised service time) for the servicing of the first vehicle 104a. The new service time may equal "4 hours", indicating that the first operator 106a is to conclude the servicing of the first vehicle 104a by 02:00 pm. The fifth instruction, communicated to the second operator device 108b, may indicate that the second operator 106b is to initiate the servicing of the fifth vehicle 104e at 12:00 pm, after the servicing of the second vehicle 104b by the second operator 106b is complete. The fifth instruction may include the fifth service job data, including the fifth set of operations, and the fifth service time. The sixth instruction, communicated to the third operator device 108c, may indicate that the third operator 106c is to initiate the servicing of the fourth vehicle 104d at 01:00 pm, after the servicing of the third vehicle 104c by the third operator 106c is complete. The sixth instruction may include the fourth service job data, including the fourth set of operations, and the fourth service time. The first operator device 108a may present, on the first display, the fourth instruction (as shown by arrow 246). Similarly, the second operator device 108b may present, on the second display, the fifth instruction (as shown by arrow 248). The third operator device 108c may present, on the third display, the sixth instruction (as shown by arrows 250). Based on the presented fifth and sixth instructions, the second and third operators 106b and 106c may initiate, based on the second sequence, the servicing of the second subset of the set of vehicles 104.

In one embodiment, a new vehicle (e.g., a sixth vehicle, not shown) requiring servicing may arrive at the service center 102 during the servicing of the first subset of the set of vehicles 104 by the plurality of operators 106. In such a scenario, the application server 112 may retrieve a sixth vehicular dataset of the sixth vehicle, determine a sixth service job data for the sixth vehicle, and a sixth service time for servicing the sixth vehicle. The application server 112 may further determine a sixth priority level for the sixth vehicle. The application server 112 may further revise the fourth and fifth priority levels to account for the sixth priority level. In such a scenario, the second subset of the set of vehicles 104 may also include the sixth vehicle. Further, the sixth service time and the sixth priority level may act as constraints in the updating of the service schedule. For example, if the sixth priority level is greater than the fourth and fifth priority levels, the sixth vehicle is serviced prior to the fourth and fifth vehicles 104d and 104e, based on the second sequence. However, if the sixth priority level is less than the fourth and fifth priority levels, the sixth vehicle is serviced after the fourth and fifth vehicles 104d and 104e, based on the second sequence.

Figure 8:
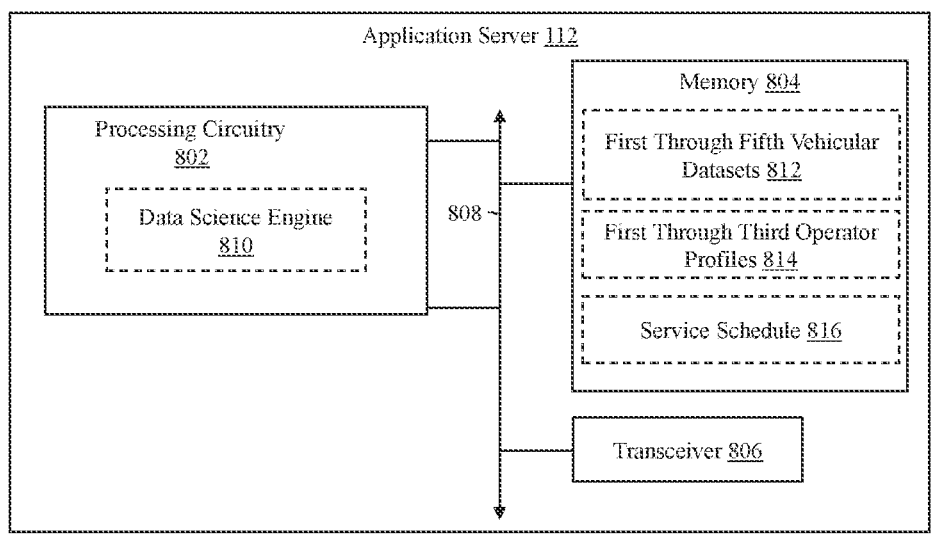
FIG. 8 is a block diagram that illustrates an application server of FIG. 1, in accordance with an exemplary embodiment of the present disclosure.

FIG. 8 is a block diagram that illustrates the application server 112, in accordance with an exemplary embodiment of the present disclosure. FIG. 8 is explained in conjunction with FIGS. 1 and 2A-2B.

The application server 112 may include processing circuitry 802, a memory 804, and a transceiver 806. The processing circuitry 802, the memory 804, and the transceiver 806 may communicate with each other by way of a communication bus 808. The processing circuitry 802 may include a data science engine 810.

The processing circuitry 802 include suitable logic, circuitry, interfaces, and/or code, executed by the circuitry, to facilitate vehicle maintenance at the service center 102. The processing circuitry 802 may be configured to receive the identification information and retrieve the first through fifth vehicular datasets of the set of vehicles 104. The processing circuitry 802 may be further configured to retrieve the first through third operator profiles of the plurality of operators 106. The processing circuitry 802 may be further configured to determine, based on the first through fifth vehicular datasets, the first through fifth service job data and the first through fifth service times for servicing the first through fifth vehicles 104a-104e. Examples of the processing circuitry 802 may include, but are not limited to, an applicationspecific integrated circuit (ASIC) processor, a reduced instruction set computer (RISC) processor, a complex instruction set computer (CISC) processor, a field programmable gate array (FPGA), and the like. The processing circuitry 802 may be a special-purpose processor that is configured to handle maintenance scheduling in real-time or near real-time. The processing circuitry 802 may execute various operations for determining the service schedule by way of the data science engine 810.

The memory 804 may include suitable logic, circuitry, interfaces, and/or code, executable by the circuitry, to store data retrieved by the processing circuitry 802 from the maintenance database 110. For example, the memory 804 stores, therein, first through fifth vehicular datasets (hereinafter, referred to as 'the first through fifth vehicular datasets 812'), the first through third operator profiles (hereinafter, referred to as 'the first through third operator profiles 814'), and the service schedule (hereinafter, referred to as 'the service schedule 816'). Examples of the memory 804 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 804 in the application server 112, as described herein. In another embodiment, the memory 804 may be realized in form of a database server or a cloud storage working in conjunction with the application server 112, without departing from the scope of the disclosure.

The data science engine 810 determines, and stores in the memory 804, the service schedule 816, using the various techniques for meta-heuristics optimization. The data science engine 810 determines the service schedule 816, based on the first through fifth vehicular datasets 812 and the first through third operator profiles 814. The data science engine 810 further updates the service schedule 816 based on changing ground conditions (e.g., delay in completion of servicing of a vehicle), as described in the foregoing description of FIG. 2B.

The transceiver 806 may include suitable logic, circuitry, interfaces, and/or code, executable by the circuitry, to transmit and receive data over the communication network 114 using one or more communication network protocols. The transceiver 806 may transmit instructions and retrieval requests and receive the identification information, status reports, and retrieval responses from the plurality of operator devices 108 and the maintenance database 110. Examples of the transceiver 806 may include, but are not limited to, an antenna, a radio frequency transceiver, a wireless transceiver, a Bluetooth transceiver, an ethernet port, a universal serial bus (USB) port, or any other device configured to transmit and receive data.

Figure 9:
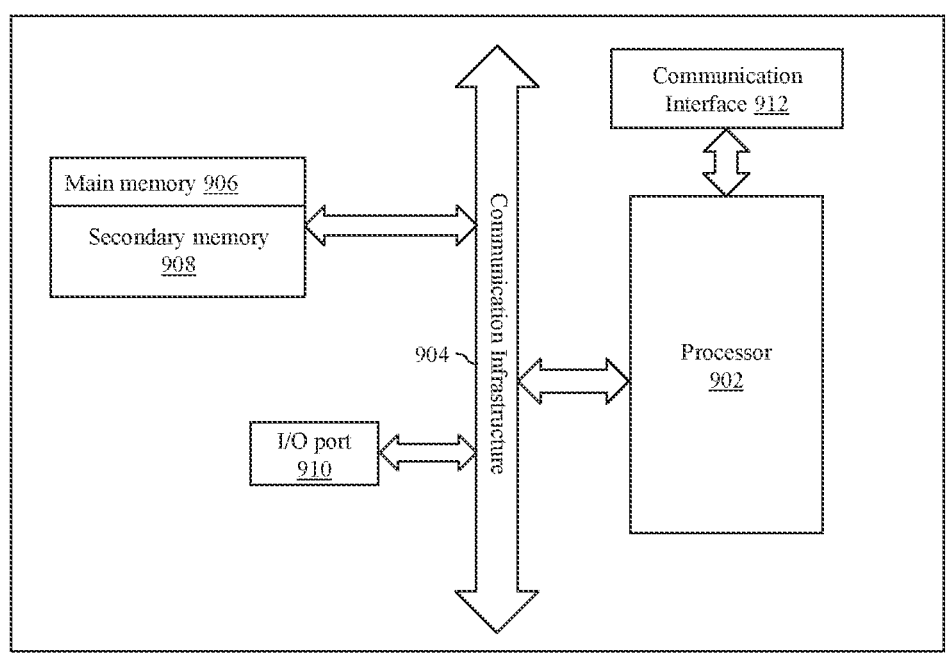
FIG. 9 is a block diagram that illustrates a system architecture of a computer system for vehicle maintenance at the service center, in accordance with an exemplary embodiment of the disclosure.

FIG. 9 is a block diagram that illustrates a system architecture of a computer system 900 for vehicle maintenance at the service center 102, in accordance with an exemplary embodiment of the disclosure. An embodiment of the disclosure, or portions thereof, may be implemented as computer readable code on the computer system 900. In one example, the application server 112 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 10A and 10B.

The computer system 900 may include a processor 902 that may be a special purpose or a general-purpose processing device. The processor 902 may be a single processor or multiple processors. The processor 902 may have one or more processor "cores." Further, the processor 902 may be coupled to a communication interface 904, such as a bus, a bridge, a message queue, the communication network 114, multi-core message-passing scheme, or the like. The computer system 900 may further include a main memory 906 and a secondary memory 908. Examples of the main memory 906 may include RAM, ROM, and the like. The secondary memory 908 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 900 may further include an input/output (I/O) port 910 and a communication infrastructure 912. The I/O port 910 may include various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication infrastructure 912 may be configured to allow data to be transferred between the computer system 900 and various devices that are communicatively coupled to the computer system 900. Examples of the communication infrastructure 912 may include a modem, a network interface, i.e., an Ethernet card, a communication port, and the like. Data transferred via the communication infrastructure 912 may be signals, such as electronic, electromagnetic, optical, or other signals as will be apparent to a person skilled in the art. The signals may travel via a communications channel, such as the communication network 114, which may be configured to transmit the signals to the various devices that are communicatively coupled to the computer system 900. Examples of the communication channel may include a wired, wireless, and/or optical medium such as cable, fiber optics, a phone line, a cellular phone link, a radio frequency link, and the like. The main memory 906 and the secondary memory 908 may refer to non-transitory computer readable mediums that may provide data that enables the computer system 900 to implement the methods illustrated in FIGS. 10A and 10B.

Figure 10A:
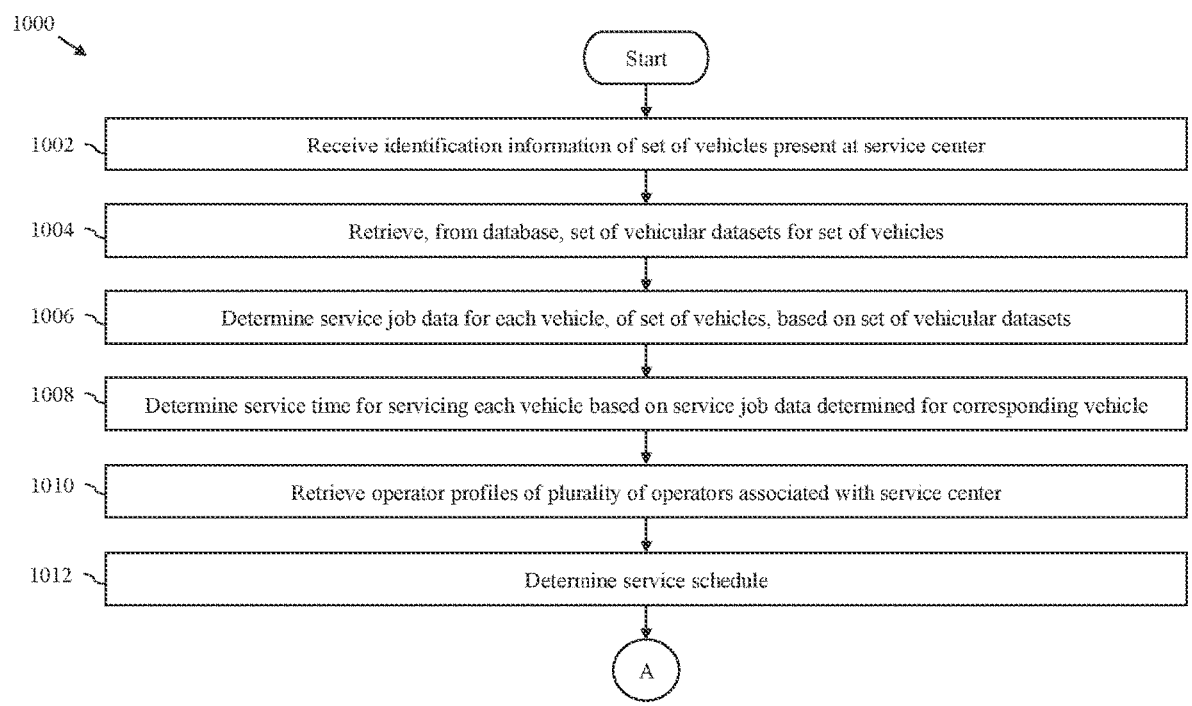
FIGS. 10A and 10B collectively, represent a flow chart that illustrates a method for facilitating vehicle maintenance at the service center, in accordance with an exemplary embodiment of the present disclosure.
Figure 10B:
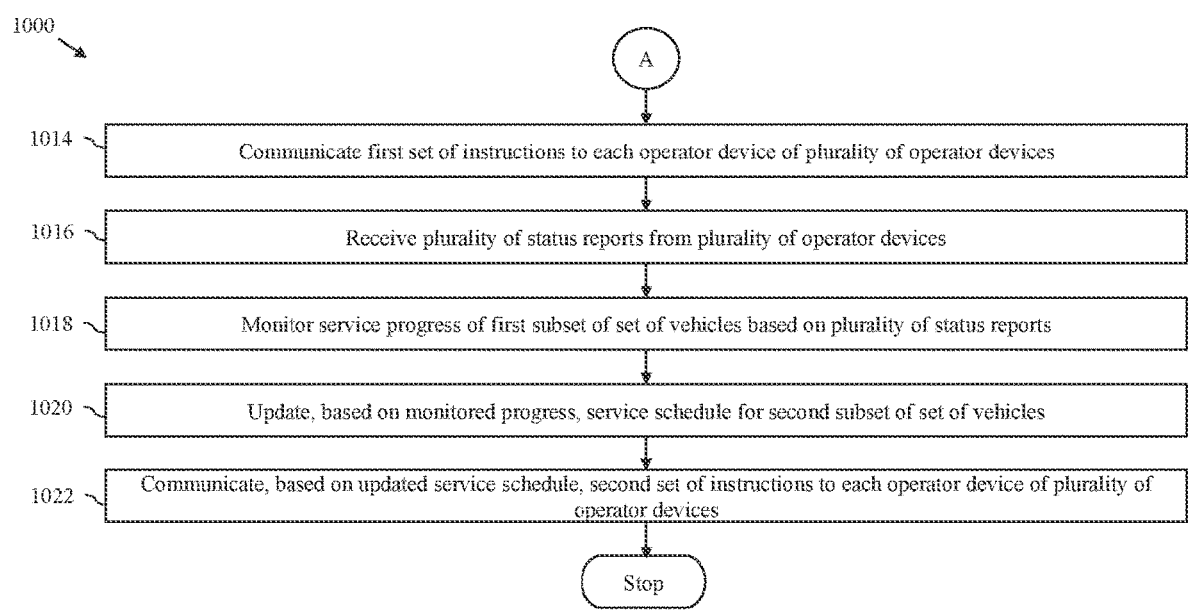

FIGS. 10A and 10B collectively, represent a flow chart 1000 that illustrates the method for facilitating vehicle maintenance at the service center 102, in accordance with an exemplary embodiment of the present disclosure.

At step 1002, the identification information of the set of vehicles 104 present at the service center 102 is received. The application server 112 is configured to receive the identification information of the set of vehicles 104 that requires servicing and is present at the service center 102. At step 1004, the first through fifth vehicular datasets 812 for the first through fifth vehicles 104*a*-104*e*, respectively, are retrieved from the maintenance database 110. Based on the received identification information, the application server 112 retrieves the first through fifth vehicular datasets 812 of the set of vehicles 104. For retrieving the first through fifth vehicular datasets 812, the application server 112 communicates the first retrieval response to the maintenance database 110. The application server 112 receives, from the maintenance database 110, the first retrieval response that includes the first through fifth vehicular datasets 812.

At step 1006, the service job data (i.e., the first through fifth service job data) for each of the set of vehicles 104 is determined, based on the first through fifth vehicular datasets 812. The application server 112 determines, based on the first through fifth vehicular datasets 812, the first through fifth service job data for the first through fifth vehicles 104a-104e, respectively (as described in the foregoing description of FIG. 2A). The first through fifth service job data includes the first through fifth sets of operations to be performed on the first through fifth vehicles 104a-104e for servicing the first through fifth vehicles 104a-104e, respectively. At step 1008, the service time (e.g., the first through fifth service times) for servicing each vehicle, of the set of vehicles 104, is determined based on the determined service job data (e.g., the first through fifth service job data) for a corresponding vehicle. The application server 112 determines the first through fifth service times for servicing the first through fifth vehicles 104a-104e based on the first through fifth service job data, respectively. At step 1010, the first through third operator profiles 814 of the plurality of operators 106 are retrieved. The application server 112, retrieves the first through third operator profiles 814 of the plurality of operators 106 associated with the service center 102 from the maintenance database 110 or the memory 804. At step 1012, the service schedule 816 for servicing the set of vehicles 104 by the plurality of operators 106 is determined. The application server 112 determines the service schedule 816 for servicing the set of vehicles 104 by the plurality of operators 106 (as described in the foregoing description of FIG. 2A). The determined service schedule 816 is indicative of the first sequence for servicing the set of vehicles 104 by the plurality of operators 106. The determined service schedule is further indicative of one or more operators, of the plurality of operators 106, that are allocated to each vehicle of the set of vehicles 104 for servicing.

With reference to FIG. 10B, at step 1014, a first set of instructions (e.g., the first through third instructions) is communicated to each operator device of the plurality of operator devices 108. The application server 112 communicates, to each operator device of the plurality of operator devices 108, the first set of instructions (e.g., the first through third instructions). The servicing of the first subset of the set of vehicles 104 is initiated, based on the first sequence, by the plurality of operators 106, based on the first set of instructions (as described in FIG. 2B). At step 1016, a plurality of status reports (e.g., the first through third status reports) are received from the plurality of operator devices 108. The application server 112 receives a plurality of status reports (e.g., the first through third status reports) from the plurality of operator devices 108. At step 1018, the progress of the servicing, of the first subset of the set of vehicles 104, is monitored based on the plurality of status reports. The application server 112 monitors the progress of the servicing of the first subset of the set of vehicles 104, based on the received plurality of status reports (as described in the foregoing description of FIG. 2B).

At step 1020, the service schedule 816 is updated, based on the monitored progress, for the second subset of the set of vehicles 104. The application server 112 updates the service schedule 816 for the second subset (e.g., the fourth and fifth vehicles 104d and 104e) of the set of vehicles 104. The servicing for each vehicle of the second subset of the set of vehicles 104 is pending. The updated service schedule 816 is indicative of the second sequence for servicing the second subset of the set of vehicles 104. At step 1022, the second set of instructions is communicated to each operator device of the plurality of operator devices 108. The application server 112 communicates, based on the updated service schedule 816, a second set of instructions (e.g., the fourth through sixth instructions) to each operator device of the plurality of operator devices 108. The servicing of the second subset of the set of vehicles 104 is initiated based on the second sequence by the plurality of operators 106.

Various embodiments of the disclosure provide the application server 112 for scheduling vehicle maintenance at the service center 102. The application server 112 may be configured to retrieve, from the maintenance database 110, the first through fifth vehicular datasets 812 for the set of vehicles 104 that requires servicing and is present at the service center 102. The application server 112 may be further configured to determine, based on the first through fifth vehicular datasets 812, the service schedule 816 for servicing the set of vehicles 104 by the plurality of operators 106 associated with the service center 102. The service schedule 816 is indicative of the first sequence for servicing the set of vehicles 104 by the plurality of operators 106. The servicing of the first subset of the set of vehicles 104 is initiated based on the first sequence by the plurality of operators 106. The application server 112 may be further configured to monitor the progress of the servicing of the first subset of the set of vehicles 104 based on the first through third status reports received from the plurality of operator devices 108 of the plurality of operators. The application server 112 may be further configured to update, based on the monitored progress, the service schedule 816 for the second subset of the set of vehicles 104. The servicing of each vehicle of the second subset of the set of vehicles is pending. The updated service schedule 816 is indicative of the second sequence for servicing the second subset of the set of vehicles 104. The servicing of the second subset of the set of vehicles 104 is initiated based on the second sequence by the plurality of operators 106.

Various embodiments of the disclosure provide a non-transitory computer-readable medium having stored thereon, computer executable instructions, which when executed by a computer, cause the computer to execute operations for scheduling vehicle maintenance at the service center 102. The operations include retrieving, by the application server 112, from the maintenance database 110, a set of vehicular datasets (e.g., the first through fifth vehicular datasets 812) for the set of vehicles 104 that requires servicing and is present at the service center 102. The operations further include determining, by the application server 112, based on the first through fifth vehicular datasets 812, the service schedule 816 for servicing the set of vehicles 104 by the plurality of operators 106 associated with the service center 102. The service schedule 106 is indicative of the first sequence for servicing the set of vehicles 104 by the plurality of operators 106. The servicing of the first subset of the set of vehicles 104 is initiated based on the first sequence by the plurality of operators 106. The operations further include monitoring, by the application server 112, the progress of the servicing of the first subset of the set of vehicles 104 based on the first through third status reports (i.e., a plurality of status reports) received from the plurality of operator devices 108 of the plurality of operators 106. The operations further include updating, by the application server 112, the service schedule 816 for the second subset of the set of vehicles 104. The servicing of each vehicle of the second subset of the set of vehicles 104 is pending. The updated service schedule 816 is indicative of the second sequence for servicing the second subset of the set of vehicles 104. The servicing of the second subset of the set of vehicles 104 is initiated based on the second sequence by the plurality of operators 106.

The disclosed methods encompass numerous advantages. The disclosed methods describe retrieving the first through fifth vehicular datasets 812 for the set of vehicles 104 and the first through third operator profiles 814 of the plurality of operators 106. The determination of the first through fifth service job data and the first through fifth service times, enable optimal allocation of the plurality of operators 106 to the set of vehicles 104, for servicing. The determination of the service schedule 816 is based on meta-heuristics optimization techniques that enable optimization of the total TAT for servicing the set of vehicles 104. The determination of the service schedule 816 may be subject to various constraints such as work timings of the plurality of operators 106, the areas of expertise of the plurality of operators 106, the first through fifth service job data, the first through fifth priority levels, or the like. This enables determination of an optimized service schedule 816 that satisfies the various constraints. Determination of a priority level (e.g., the first through fifth priority levels) for each vehicle (e.g., the set of vehicles 104) enables preferential servicing of vehicles associated high driver score scores, regular service history, low running cost per unit distance, high asset health index or the like. This enables a transport aggregator to ensure a minimal downtime during servicing for its most profitable vehicles (e.g., vehicles low running cost per unit distance and high driver score), leading to increased revenues for the transport aggregator and/or drivers employed by the transport aggregator. Monitoring of the servicing of the set of vehicles based on status reports, from operator devices of the operators, enables dynamic updating of the service schedule 816 based on changing ground conditions or realities. This aspect of dynamically updating the service schedule 816 improves an efficiency, i.e., throughput of the service center 102, allowing the service center 102 to service an increased number of vehicles every day.

Techniques consistent with the disclosure provide, among other features, systems and methods for facilitating vehicle maintenance at the service center 102. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for vehicle maintenance at a service center, comprising:

retrieving, by a cloud based server, over a communication network, sensor outputs generated by a plurality of sensors in each vehicle of a set of vehicles indicating a current health status of a corresponding vehicle in the set of vehicles;

storing, by a cloud-based server over a communication network, in a memory, based on received sensor outputs, a set of vehicular datasets for the set of vehicles, wherein each of the set of vehicular datasets stored in the memory is mapped to a vehicle registration number of the corresponding vehicle of the set of vehicles;

retrieving, by the cloud-based server, a plurality of images of a first plurality of vehicles from one or more cameras configured to capture an image of a vehicle registration plate based on an arrival of the first plurality of vehicles at service center, wherein the set of vehicles includes the first plurality of vehicles;

processing, by the cloud-based server, received plurality of images to recognize a vehicle registration number of each of the first plurality of vehicles based on image recognition;

retrieving, by the cloud-based server, from the set of vehicular datasets stored in the memory, using the recognized vehicle registration number of each of the first plurality of vehicles, a plurality of vehicular datasets of the first plurality of vehicles that requires servicing;

based on a value obtained from a set of elements retrieved from plurality of the set of vehicular datasets, wherein the set of elements comprise one of an identification information of the first plurality of vehicles, an asset health index of the first plurality of vehicles, a probability of failure of a braking system in the first plurality of vehicles, driver scores of drivers of the first plurality of vehicles, a running cost per unit distance, and a service interval, determining, by the cloud-based server, service job data for each vehicle of the first plurality of vehicles, wherein determined service job data indicates a first plurality of operations to be executed on the first plurality of vehicles for servicing the first plurality of vehicles;

automatically scheduling, by the cloud-based server, the first plurality of operations to be executed in a first sequence by a plurality of operators associated with the service center in real-time or near real-time, wherein automatically scheduling the first plurality of operations includes implementing one or more meta-heuristic optimization algorithms that determine the first sequence in which a total turn-around time for executing the first plurality of operations is minimum, wherein in accordance with the first sequence, execution of a second plurality of operations for servicing a second plurality of vehicles from the first plurality of vehicles is initiated by the plurality of operators and execution of a third plurality of operations for servicing a third plurality of vehicles from the first plurality of vehicles is queued subsequent to the second plurality of operations, and wherein the first plurality of operations include the second plurality of operations and the third plurality of operations;

allocating, by the cloud-based server, one or more operators of the plurality of operators for executing the first plurality of operations;

communicating a signal, by the cloud-based server, over the communication network, to plurality of electronic devices indicative of the first plurality of operations to be executed, wherein the execution of the first plurality of operations is initiated by the one or more operators based on the communication;

detecting, by the cloud-based server, based on sensor data received from a plurality of electronic devices of the plurality of operators and processing of a plurality of video feeds that capture the plurality of operators servicing the second plurality of vehicles, an anomaly in the execution of the second plurality of operations that delay execution of queued third plurality of operations from corresponding scheduled service times; and automatically changing, by the cloud-based server, based on detected anomaly, a sequence of execution of the third plurality of operations to a second sequence by reallocation of the third plurality of operations to the plurality of operators, wherein execution of the third plurality of operations is initiated based on the second sequence, and wherein the third plurality of vehicles is different from the second plurality of vehicles.

2. The method of claim 1, wherein the service job data for each vehicle is included in first set of instructions communicated to a corresponding operator of the plurality of operators.

3. The method of claim 2, further comprising determining, by the cloud-based server, a service time for executing each operation of the first plurality of operations based on the service job data determined for the corresponding vehicle.

4. The method of claim 3, wherein the automatic scheduling is further based on determined service time for executing each operation of the first plurality of operations.

5. The method of claim 1, wherein the first sequence further indicative of one or more operators of the plurality of operators are allocated to each vehicle of the first plurality of vehicles for servicing.

6. The method of claim 5, further comprising retrieving, by the cloud-based server, from the memory, a plurality of operator profiles of the plurality of operators, wherein the one or more operators, of the plurality of operators, are allocated to each vehicle of the first plurality of vehicles based on the plurality of operator profiles.

7. The method of claim 6, wherein each of the plurality of operator profiles includes at least an identifier of an operator of the plurality of operators, work timings of the operator, a number of vehicles serviced by the operator, a work history of the operator, and one or more areas of expertise of the operator.

8. The method of claim 1, further comprising communicating, by the cloud-based server, over the communication network, a second set of instructions, that indicates the second sequence, to each electronic device of the plurality of electronic devices, wherein the execution of the third plurality of operations is initiated by the plurality of operators based on the second set of instructions.

9. The method of claim 1, wherein the automatic scheduling of the first plurality of operations is further based on a priority level associated with each of the first plurality of vehicles.

10. The method of claim 1, wherein each vehicular dataset of the set of vehicular datasets includes at least identification information, a health index, a probability of failure of braking system, a driver score, a running cost per unit distance, a service history, the current health status, and a manufacturer mandated service interval of a corresponding vehicle of the set of vehicles.

11. The method of claim 1, wherein the total turn-around time for servicing the first plurality of vehicles is a function of service time and wait time before servicing associated with each vehicle of the first plurality of vehicles.

12. The method of claim 1, wherein changing the sequence of execution of the third plurality of operations to the second sequence is further based an arrival of a new vehicle, different from each of the first plurality of vehicles, at service center during execution of the second plurality of operations.

13. A system for vehicle maintenance comprising:
a cloud-based server communicatively coupled to a set of vehicles over a communication network and configured to:
retrieve, by a cloud based server, over a communication network, sensor outputs generated by a plurality of sensors in each vehicle of a set of vehicles indicating a current health status of a corresponding vehicle in the set of vehicles
store, in a memory, based on received sensor outputs, a set of vehicular datasets for the set of vehicles, wherein each of the set of vehicular datasets stored in the memory is mapped to a vehicle registration number of the corresponding vehicle of the set of vehicles;
retrieve, by the cloud-based server, a plurality of images of a first plurality of vehicles from one or more cameras configured to capture an image of a vehicle registration plate based on an arrival of the first plurality of vehicles at service center, wherein the set of vehicles includes the first plurality of vehicles;
process received plurality of images to recognize a vehicle registration number of each of the first plurality of vehicles based on image recognition;
retrieve, from the set of vehicular datasets stored in the memory, from the recognized vehicle registration number of each of the first plurality of vehicles, a plurality of vehicular datasets of the first plurality of vehicles that requires servicing;
based on a value obtained from a set of elements retrieved from plurality of the set of vehicular datasets, wherein the set of elements comprise one of an identification information of the first plurality of vehicles, an asset health index of the first plurality of vehicles, a probability of failure of a braking system in the first plurality of vehicles, driver scores of drivers of the first plurality of vehicles, a running cost per unit distance, and a service interval, determine, by the cloud-based server, service job data for each vehicle of the first plurality of vehicles, wherein determined service job data indicates a first plurality of operations to be executed on the first plurality of vehicles for servicing the first plurality of vehicles;
automatically schedule, the first plurality of operations to be executed in a first sequence by a plurality of operators associated with the service center in real-time or near real-time, wherein the first plurality of operations are automatically scheduled based on implementation of one or more meta-heuristic optimization algorithms that determine the first sequence in which a total turn-around time for execution of the first plurality of operations is minimum, wherein in accordance with the first sequence, execution of a second plurality of operations for the service of a second plurality of vehicles from the first plurality of vehicles is initiated by the plurality of operators and execution of a third plurality of operations to service a third plurality of vehicles from the first plurality of vehicles is queued subsequent to the second plurality of operations, and wherein the first plurality of operations include the second plurality of operations and the third plurality of operations;
allocate one or more operators of the plurality of operators for execution of the first plurality of operations;
communicate a signal, to plurality of electronic devices, indicative of the first plurality of operations to be executed, wherein the execution of the first plurality of operations is initiated by the one or more operators based on the communication;

detect, based on sensor data received from a plurality of electronic devices of the plurality of operators and processing of a plurality of video feeds that capture the plurality of operators that service the second plurality of vehicles, an anomaly in the execution of the second plurality of operations that delay execution of queued third plurality of operations from corresponding scheduled service times; and automatically change, based on detected anomaly, a sequence of execution of the third plurality of operations to a second sequence by reallocation of the third plurality of operations to the plurality of operators, wherein execution of the third plurality of operations is initiated based on the second sequence, and wherein the third plurality of vehicles is different from the second plurality of vehicles.

14. The system of claim 13, wherein the service job data for each vehicle is included in first set of instructions communicated to a corresponding operator of the plurality of operators.

15. The system of claim 14, wherein the cloud-based server is to determine a service time for execution of each operation of the first plurality of operations based on the service job data determined for the corresponding vehicle.

16. The system of claim 15, wherein the first plurality of operations are automatically scheduled further based on the determined service time for execution of each operation of the first plurality of operations.

* * * * *